United States Patent
Shiga et al.

(10) Patent No.: US 7,353,542 B2
(45) Date of Patent: Apr. 1, 2008

(54) STORAGE SYSTEM, COMPUTER SYSTEM, AND METHOD OF AUTHORIZING AN INITIATOR IN THE STORAGE SYSTEM OR THE COMPUTER SYSTEM

(75) Inventors: Kenta Shiga, Yokohama (JP); Atsuya Kumagai, Kawasaki (JP); Daiki Nakatsuka, Yokohama (JP); Keisei Fujiwara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 662 days.

(21) Appl. No.: 10/878,186

(22) Filed: Jun. 29, 2004

(65) Prior Publication Data

US 2005/0257274 A1 Nov. 17, 2005

(30) Foreign Application Priority Data

Apr. 26, 2004 (JP) .............................. 2004-129339

(51) Int. Cl.
*H04L 29/00* (2006.01)

(52) U.S. Cl. .................... 726/28; 726/29; 713/170; 713/183; 705/56; 711/164; 707/10

(58) Field of Classification Search ................ 713/155, 713/162, 170, 183; 705/56; 726/4, 28, 21, 726/29; 711/154, 164; 707/10
See application file for complete search history.

(56) References Cited

U.S. PATENT DOCUMENTS

| | | | |
|---|---|---|---|
| 6,484,245 B1 | 11/2002 | Sanada et al. .............. 711/164 |
| 6,738,877 B1 | 5/2004 | Yamakawa et al. ......... 711/164 |
| 7,099,904 B2 * | 8/2006 | Nakatsuka .................. 707/205 |
| 2002/0138691 A1 | 9/2002 | Yamamoto et al. ......... 711/112 |
| 2004/0039829 A1 | 2/2004 | Bucher ....................... 709/229 |
| 2004/0088513 A1 | 5/2004 | Biessener et al. ........... 711/173 |
| 2004/0186898 A1 | 9/2004 | Kimura et al. .............. 709/213 |

FOREIGN PATENT DOCUMENTS

| | | |
|---|---|---|
| EP | 1122628 | 8/2001 |
| JP | 3228182 | 9/2001 |

OTHER PUBLICATIONS

Hu Yoshida "LUN Security Considerations for Storage Area Networks" Hitachi Data Systems, 1999, pp. 1-7 XP002185193.

* cited by examiner

*Primary Examiner*—Matthew Smithers
*Assistant Examiner*—Paul Callahan
(74) *Attorney, Agent, or Firm*—Mattingly, Stanger, Malur & Brundidge, P.C.

(57) ABSTRACT

In a computer system in which one or more computers on which one or more initiators operate and a storage device on which one or more targets operate are connected with each other through a network, an authentication table for authenticating validity of a user of a computer is associated with an authorization table for authorizing access of an initiator to a certain target, to limit such accesses.

18 Claims, 18 Drawing Sheets

FIG.5A

AUTHENTICATION TABLE: 130

| AUTHENTICATION TYPE | AUTHENTICATION NAME | AUTHENTICATION INFORMATION |
|---|---|---|
| iscsi-chap | tanaka | secret00 |
| ipsec-psk | suzuki | xyz012abc |
| ... | ... | ... |

FIG.5B iSCSI NAME-BASED AUTHORIZATION TABLE: 131

| INITIATOR iSCSI NAME | TARGET iSCSI NAME |
|---|---|
| iqn.2003-12.com.abc:pc01 | iqn.2003-12.com.abc:raid0001-01 |
| iqn.2003-12.com.abc:pc02 | iqn.2003-12.com.abc:raid0001-02 |
| ... | ... |

FIG.5C

AUTHENTICATIN NAME-BASED AUTHORIZATION TABLE: 132

| AUTHENTICATION TYPE | AUTHENTICATION NAME | NODE TYPE | iSCSI NAME |
|---|---|---|---|
| iscsi-chap | tanaka | initiator | iqn.2003-12.com.abc:pc01 |
| ipsec-psk | suzuki | target | iqn.2003-12.com.abc:raid0001-01 |
| ... | ... | ... | ... |

FIG.6A  iSCSI NODE TABLE: 230

| 2300 | 2301 | 2302 |
|---|---|---|
| NODE TYPE | MANAGEMENT IP ADDRESS | iSCSI NAME |
| initiator | 192.168.128.2 | iqn.2003-12.com.abc:pc01 |
| target | 192.168.129.2 | iqn.2003-12.com.abc:raid0001-01 |
| ... | ... | ... |

FIG.6B  iSCSI NAME TABLE: 330

| 3300 | 3301 | 3302 | 3303 |
|---|---|---|---|
| iSCSI NAME | NODE TYPE | IP ADDRESS | PORT NUMBER |
| iqn.2003-12.com.abc:pc01 | initiator | 192.168.0.2 | 0 |
| iqn.2003-12.com.abc:raid0001-01 | target | 192.168.1.2 | 3260 |
| ... | ... | ... | ... |

FIG.6C  DOMAIN TABLE: 331

| 3310 | 3311 |
|---|---|
| DOMAIN NAME | iSCSI NAME |
| dd-01 | iqn.2003-12.com.abc:pc01 |
| dd-01 | iqn.2003-12.com.abc:pc02 |
| ... | ... |

FIG.6D  DOMAIN SET TABLE: 332

| 3320 | 3321 |
|---|---|
| DOMAIN SET NAME | DOMAIN NAME |
| dds-01 | dd-01 |
| dds-01 | dd-02 |
| ... | ... |

FIG.8A

```
═══════════ DOMAIN REGISTRATION SCREEN ═══════════  ~800

DOMAIN NAME :        [                    ]  ~801

DOMAIN SET NAME :    [                    ]  ~802

INITIATORS BELONGING TO DOMAIN :   803
┌─────────────────────────────────────┬─┐ ~804
│ iqn.2003 - 12.com.abc:pc01          │▲│
│ iqn.2003 - 12.com.abc:pc02          │ │
│ iqn.2003 - 12.com.abc:pc03          │█│ ~805
│ iqn.2003 - 12.com.abc:pc04          │▼│
└─────────────────────────────────────┴─┘ ~806

TARGETS BELONGING TO DOMAIN :   807
┌─────────────────────────────────────┬─┐ ~808
│ iqn.2003 -12.com.abc:raid0001  - 01 │▲│
│ iqn.2003 -12.com.abc:raid0001  - 02 │ │
│ iqn.2003 -12.com.abc:raid0001  - 03 │█│ ~809
│ iqn.2003 -12.com.abc:r aid0001 - 04 │▼│
└─────────────────────────────────────┴─┘ ~810

[ OK ]   [ Cancel ]
   818      819
```

FIG.8B

```
═══════ AUTHENTICATION INFORMATION REGISTRATION SCREEN ═══════ ~820
                                                                ~821
AUTHENTICATION       [ iSCSI — CHAP              ▼]  ~822
METHOD :

AUTHENTICATION NAME :     [                    ]  ~823

AUTHENTICATION
INFORMATION :             [                    ]  ~824

[ REFERENCE ] ~825

[ OK ]   [ Cancel ]
   828      829
```

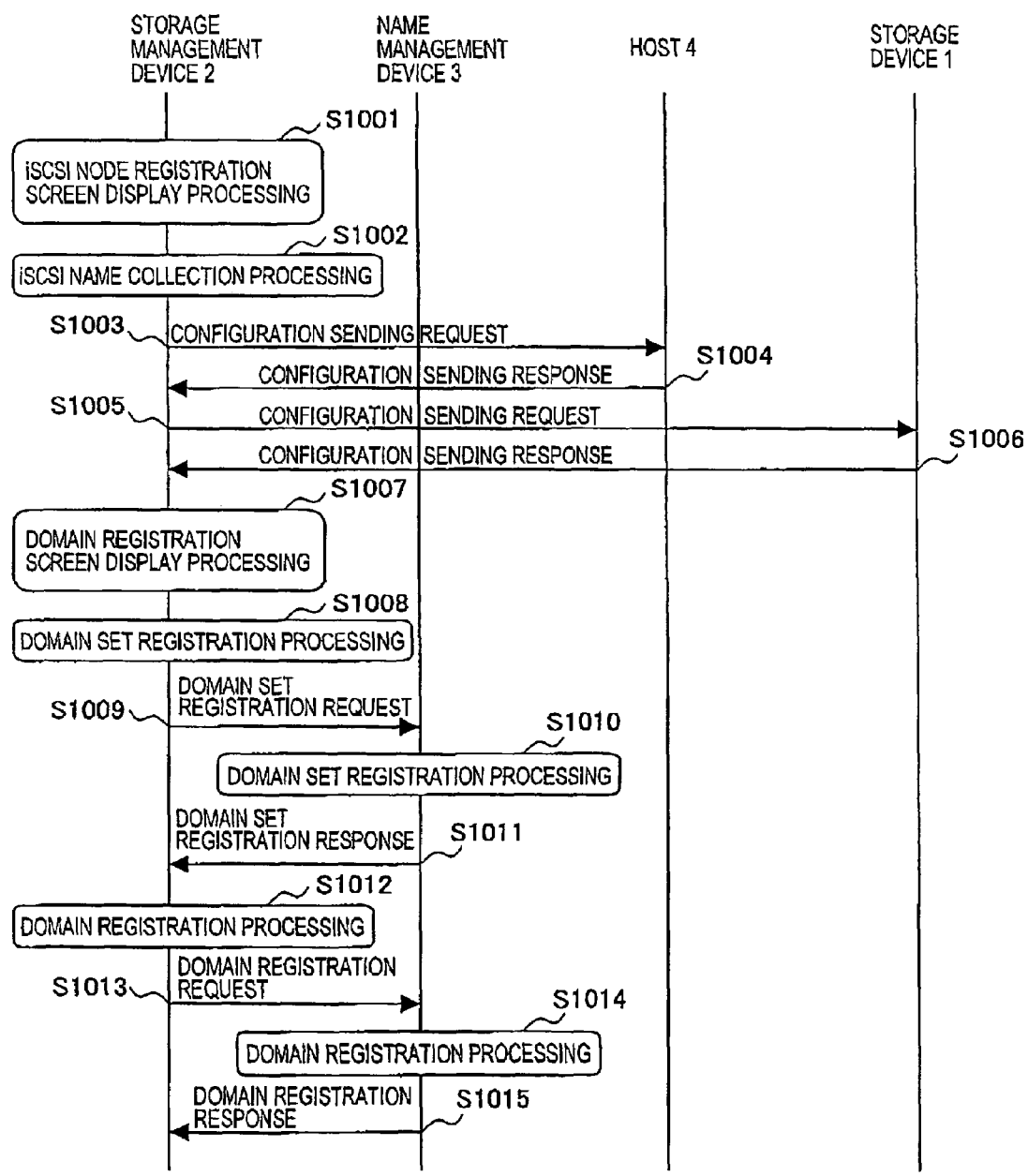

FIG.16

AUTHORIZATION TABLE: 134

| AUTHENTICA-TION TYPE (1340) | AUTHENTICATION NAME (1341) | INITIATOR iSCSI NAME (1342) | TARGET iSCSI NAME (1343) |
|---|---|---|---|
| iscsi-chap | tanaka | iqn.2003-12.com.abc: pc01 | iqn.2003-12.com.abc: raid0001-01 |
| ipsec-psk | suzuki | iqn.2003-12.com.abc: pc02 | iqn.2003-12.com.abc: raid0001-02 |
| ... | ... | ... | ... |

FIG.17

AUTHORIZATION INFORMATION REGISTRATION SCREEN — 1700

— 1701

USER — 1703

AUTHENTICATION METHOD: iSCSI – CHAP — 1704 / 1705

AUTHENTICATION NAME: suzuki — 1706 iSCSI NODE — 1702

DESIGNATION METHOD: ● iSCSI NAME (1707)  ○ DOMAIN NAME (1708)  ○ DOMAIN SET NAME (1709) — 1710

INITIATOR iSCSI NAME: iqn .2003-12. com. abc :pc 01 — 1711 / 1712

TARGET iSCSI NAME: iqn .2003-12. com. abc :raid0001- 01 — 1713 / 1714

DOMAIN NAME: dd - 01 — 1715 / 1716

DOMAIN SET NAME: dds - 01 — 1717

OK (1718)   Cancel (1719)

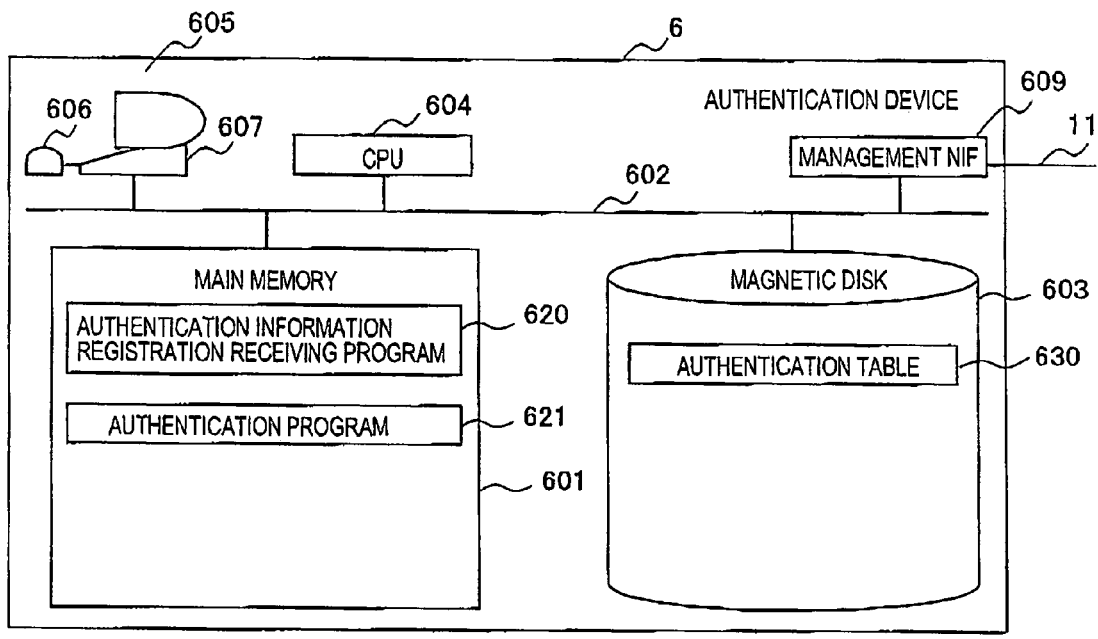

STORAGE SYSTEM, COMPUTER SYSTEM, AND METHOD OF AUTHORIZING AN INITIATOR IN THE STORAGE SYSTEM OR THE COMPUTER SYSTEM

BACKGROUND OF THE INVENTION

The present invention relates to a technique of authentication performed by a storage device connected through a network when a computer accesses the storage device.

A function of authorization is one of functions used for improving security of a storage area network (hereinafter, referred to as a SAN) that employs the fibre channel (hereinafter, referred to as FC). The authorization function is a function used by a storage device to examine an access right of a computer when the computer accesses a resource (for example, a disk) of a storage device, in order to judge whether the computer can access the resource.

LUN (Logical Unit Number) masking is one of the authorization functions. The LUN masking is a technique employed on the side of a storage device to limit computers that are permitted to access logical units (hereinafter, referred to as LU) contained in the storage device so as to prevent illegal reference, alteration and deletion of data (See, for example, Japanese Patent No. 3228182).

On the other hand, iSCSI is attracting attention as a technique for realizing reduction of acquisition costs of a SAN and for making a SAN applicable to a wider area. According to iSCSI, SCSI commands and the like are stored (encapsulated) in transmission frames of TCP packets that are in turn stored in payloads of IP packets, and sent and received through an IP network, to realize I/O processing between a computer and a storage device. A SAN using iSCSI is called an IP-SAN.

As for a storage device (hereinafter, referred to as an iSCSI-capable storage device) that supports iSCSI, it is possible to realize an authorization function that is equivalent to the LUN masking. To that end, the storage device has a table (hereinafter, referred to as an authorization table) for holding correspondence between an iSCSI name of an initiator and an iSCSI name of a target that can be accessed from that initiator. When the storage device receives a login request from an initiator, the storage device extracts iSCSI names of the initiator and the target, and checks the iSCSI names by referring to its authorization table, to judge whether the login should be accepted or not.

Generally, an iSCSI-capable storage device further has an authentication function, in addition to the above-mentioned authorization function. The authentication function is a function to confirm validity of a user of an initiator. A storage device that supports the authentication function has a table (hereinafter, referred to as an authentication table) for holding correspondence between an authentication name and authentication information such as a password. When a storage device receives an authentication request from an initiator after the storage device responds to a login request from the initiator, the storage device extracts an authentication name and authentication information, and checks the authentication name and the authentication information to judge whether the login should be accepted.

Although iSCSI itself is provided with such an authentication function, it is possible to use an authentication function of IKE (Internet Key Exchange), which is one of protocols constituting IPSec.

In the case where the above-mentioned authorization function and authentication function are employed to improve security, an initiator can log in a target only when a storage device judges the login to be permitted as a result of the authorization processing and then as a result of the authentication processing.

SUMMARY OF THE INVENTION

An initiator composes a login request, using an iSCSI name of that initiator and an iSCSI name of a target as an access object. Differently from a WWN (World Wide Name) (which is an identifier assigned fixedly to a hardware apparatus) in FC, an iSCSI name of an initiator is set by software. Accordingly, an administrator of a computer can easily change the iSCSI name. Further, in many cases, a default iSCSI name of an initiator is automatically generated from a host name of a computer.

Thus, in the case where an IP-SAN is connected with a plurality of computers permitted to access respective different targets, a computer may access a target other than the ones that the computer is permitted to access.

In other words, an administrator of a computer A connected to an IP-SAN or a cracker who steals an administrator's right of the computer A can conjecture an iSCSI name of an initiator B operating on another computer B.

Further, using a protocol such as SLP (Service Location Protocol) or iSNS (internet Simple Naming Service), an initiator operating on the above-mentioned computer A can easily acquire iSCSI names of all the targets that the initiator B can access.

Using the iSCSI name of the initiator B and iSCSI names of the targets that the initiator B is permitted to access, the initiator operating on the computer A can compose a login request impersonating the initiator B.

Authorization processing is performed in the iSCSI layer, while authentication processing is performed sometimes in the iSCSI layer and sometimes in the IPSec layer. In terms of the seven layers of OSI, the IPSec layer is positioned between the network layer and the transport layer and the iSCSI layer is the application layer.

The above-described technique does not suppose that acceptance or rejection of login is judged based on a combination of an authentication name and an iSCSI name (i.e., names of different layers), and accordingly, can not prevent the above-mentioned impersonation.

Namely, it is impossible to prevent access of an invalid user through a computer that is valid to a storage device, access to a target that the computer is not permitted to access, and the like.

In the following sentences, details will be described referring to a system comprising a personal computer (hereinafter, referred to as PC1) used by a user "Tanaka", a personal computer (hereinafter, referred to as PC2) used by a user "Suzuki", and a storage device that stores LU assigned to each personal computer, as an example.

It is assumed that an initiator operating on PC1 has an iSCSI name "iqn.2003-12.com.abc:pc1" and uses an authentication name "tanaka" and authentication information "abc" for authentication. Further, it is assumed that an initiator operating on PC2 has an iSCSI name "iqn.2003-12.com.abc:pc2" and uses an authentication name "suzuki" and authentication information "xyz" for authentication.

On the storage device, operate a target that has an iSCSI name "iqn.2003-12.com.abc:pc1-vol" and has LU assigned to PC1 and a target that has an iSCSI name "iqn.2003-12.com.abc:pc2-vol" and has LU assigned to PC2.

The initiator "iqn.2003-12.com.abc:pc1" operating on PC1 is permitted to access the target "iqn.2003-12.com.abc:

pc1-vol". And the initiator "iqn.2003-12.com.abc:pc2" operating on PC2 is permitted to access the target "iqn.2003-12.com.abc:pc2-vol".

The storage device has its authorization table, which holds a record consisting of an entry of the initiator name "iqn.2003-12.com.abc:pc1" and an entry of the target name "iqn.2003-12.com.abc:pc1-vol" and a record consisting of an entry of the initiator name "iqn.2003-12.com.abc:pc2" and an entry of the target name "iqn.2003-12.com.abc:pc2-vol".

Further, the storage device has its authentication table, which holds a record consisting of an entry of the authentication name "tanaka" and an entry of the authentication information "abc" and a record consisting of an entry of the authentication name "suzuki" and an entry of the authentication information "xyz".

Now, in this system, is considered the case where the user "Tanaka" can conjecture the iSCSI name of the initiator operating on PC2, based on the host name or the like. When the user "Tanaka" change the iSCSI name of the initiator of PC1 to "iqn.2003-12.com.abc:pc2" and thereafter that initiator sends a login request to iqn.2003-12.com.abc:pc2-vol, then the login is accepted as a result of authorization processing based on the above-mentioned authorization table.

Further, when the initiator uses the already-set authentication name and authentication information (i.e., "tanaka" and "abc") to send an authentication request to iqn.2003-12.com.abc:pc2-vol, then the login is accepted as a result of authentication processing since the record of a combination of the authentication name and authentication information exists in the above-mentioned authentication table.

Finally, the initiator operating on PC1 can access the LU assigned to PC2. Thus, for example, the user "Tanaka" can read personal information of the user "Suzuki", which the user "Tanaka" does not have an access right.

Thus, the conventional technique performs authorization processing using authorization information, which is not secret information by any means, and authentication processing using a password or the like, independently of each other, and accordingly, can not prevent fraudulent access from a valid computer. Particularly, prevention of fraudulent access is desired in a system where many computers shares one storage device, such as a system where hard disks of personal computers of employees of a company are aggregated into one mass storage device, for example.

Considering the above situation, an object of the present invention is to provide a technique that improves security with respect to access from a computer to a storage device connected to that computer through a network.

To solve the above problem, the present invention provides a computer system in which one or more computers on which one or more initiators operate and a storage device on which one or more targets operate are connected through a network, and an authentication table and authorization table are used in association with each other to limit accesses to the targets.

Thus, the present invention provides a storage system having a plurality of storing areas that can be accessed from a plurality of computers connected to the storage system through a network.

The storage system includes: an authorization table that stores a combination of a computer identifier which identifies a computer among the above-mentioned plurality of computers and a storing area identifier for specifying a storing area that the computer identified by that computer identifier can access; an authorization means that uses the authorization table for authorizing a computer that accesses a storing area; an authentication table which stores a user identifier of a user who uses a computer and authentication information which authenticates the user; a user authentication means that uses the authentication table which authenticates a user accessing the storage system; an authentication name authorization table which stores a combination of an identifier of a user and a storing area identifier of a storing area that the user identified by the identifier is permitted to access; and an authentication name authorization means that uses the authentication name authorization table for judging whether a user, who is authenticated by the user authentication means and accesses a storing area from a computer authorized by the authorization means, has a valid access right to the storing area and permits the access of the user only when the user has the valid access right.

Further, the present invention provides a method of authorizing an initiator in a computer system in which a computer on which an initiator operates and a storage system on which a target operates are connected through a network, wherein:

said storage system has an authorization table which stores a correspondence between an initiator identifier which identifies the initiator and a target identifier which identifies the target that the initiator is permitted to log in, an authentication table which stores a correspondence between a user identifier which identifies a user of the computer and authentication information which authenticates the user, and an authentication name authorization table which stores a correspondence between a user identifier and a target identifier of a target that a user identified by the user identifier is permitted to access;

when the storage system receives a login request including an initiator identifier of an initiator operating on the computer and a target identifier of a target to which access is requested, from that initiator, the storage system extracts the initiator identifier and the target identifier from the login request and checks the extracted identifiers referring to the authorization table to judge acceptance or rejection of the login;

when it is judged that the login is acceptable, then the storage system receives an authentication request including the user identifier and authentication information of the user using the computer, from the computer, and extracts the user identifier and the authentication information from the authentication request, and checks the combination of the user identifier and the authentication information referring to the authentication table to judge the authentication should be permitted;

when it is judged that the authentication should be permitted, the storage system checks a combination of the user identifier included in the authentication request and the target identifier included in the login request referring to the authentication name authorization table; and when the combination is matched with the authentication name authorization table, then the storage system permits the initiator that has sent the login request to access the target that the login request requests to access,

BRIEF DESCRIPTION OF THE DRAWINGS

FIG. 5A is a diagram showing an example of a data structure of an authentication table 130;

FIG. 5B is a diagram showing an example of a data structure of an iSCSI name-based authorization table 131;

FIG. 5C is a diagram showing an example of a data structure of an authentication name-based authorization table 132;

FIG. 6A is a diagram showing an example of a data structure of an iSCSI node table 230;

FIG. 6B is a diagram showing an example of a data structure of an iSCSI name table 330;

FIG. 6C is a diagram showing an example of a data structure of a domain table 331;

FIG. 6D is a diagram showing an example of a data structure of a domain set table 332:

FIG. 8A is a diagram showing an example of display of a domain registration screen 800;

FIG. 8B is a diagram showing an example of display of an authentication information registration screen 820;

FIG. 10 is a diagram showing an example of a sequence of communication between devices at the time of registering information of an iSCSI node, a discovery domain, and a discovery domain set;

FIG. 16 is a diagram showing an example of a data structure of an authorization table 134;

FIG. 17 is a diagram showing an example of display of an authorization information registration screen 1700;

FIG. 19 is a diagram for explaining a configuration of an authentication device 6; and FIG. 20 is a diagram showing an example of a data structure of an authentication table 630.

DESCRIPTION OF THE PREFERRED EMBODIMENTS

Figure 1:
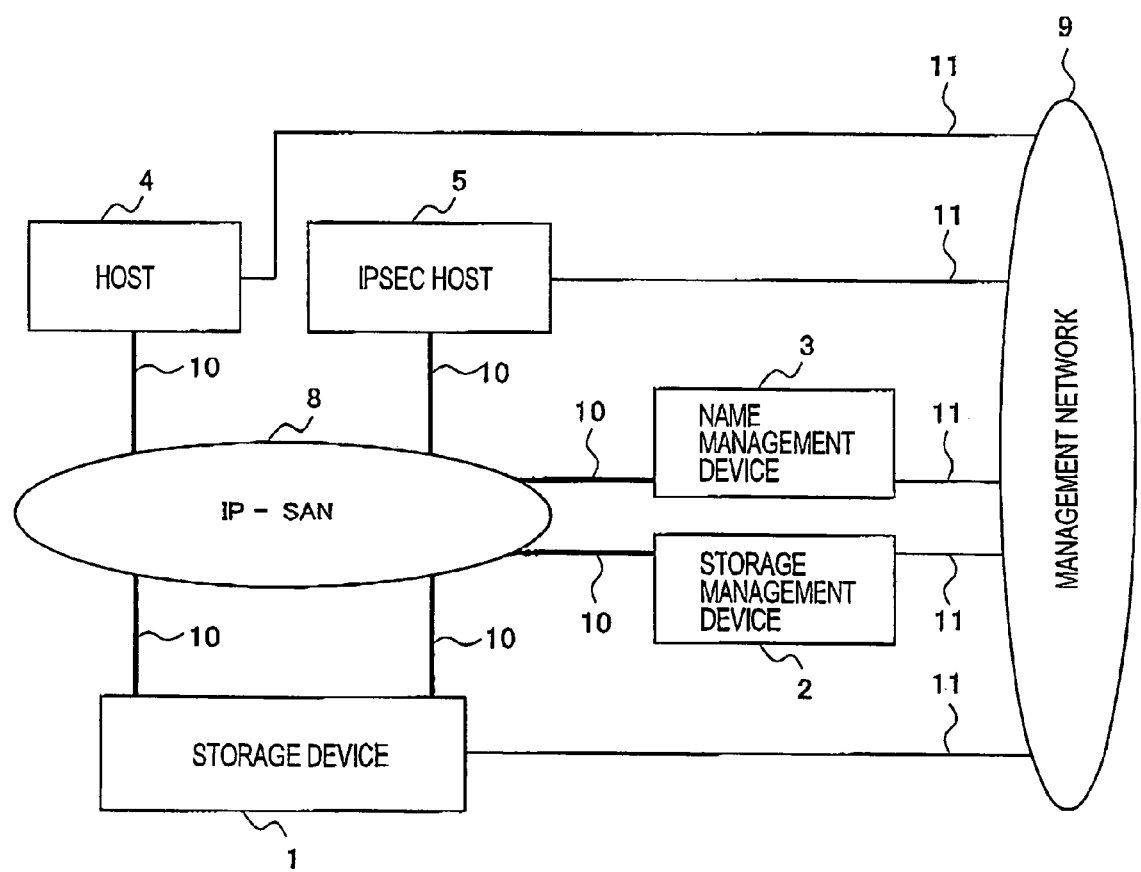
FIG. 1 is a diagram showing an example of a configuration of a computer system of an embodiment of the present invention.

Now, embodiments of the present invention will be described referring to the drawings. In the below-mentioned drawings, the same reference numeral refers to the same component.

First, a first embodiment of a computer system will be described.

FIG. 1 is a diagram showing an example of a configuration of a computer system of the present embodiment. The computer system comprises: a storage device 1 that has a communicating function to communicate with a host by means of iSCSI and is a storage system having a single storage unit or a plurality of storage units; a storage management device 2, i.e., a device which manages the storage device 1; a name management device 3 which manages iSCSI names of the host and the storage device 1 in a centralized manner; the host 4 having a function to communicate with the storage device 1 by means of iSCSI; an IPSec host 5, i.e., a host having a function to communicate with the storage device 1 by means of iSCSI after establishing a secure channel by means of IPSec; an IP-SAN 8, i.e., a network on which iSCSI traffic flows; and a management network 9, i.e., a network on which management traffic flows.

Further, the storage device 1, the storage management device 2, the name management device 3, the host 4, the IPSec host 5 and the IP-SAN 8 are connected through communication lines 10 of UTP cable, optical fiber cable, or the like. Similarly, the storage device 1, the storage management device 2, the name management device 3, the host 4, the IPSec host 5 and the management network 9 are connected through communication lines 11 of UTP cable, optical fiber cable, or the like. The above-mentioned storage system may employ a RAID configuration.

Figure 2A:
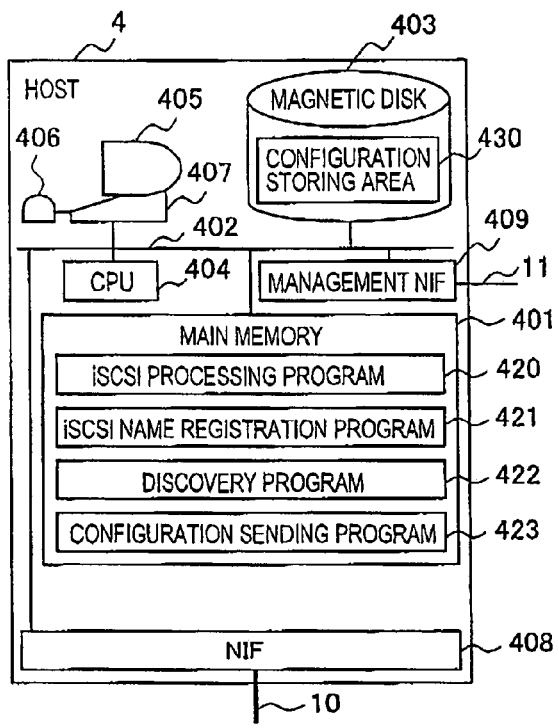
FIGS. 2A, 2B and 2C are diagrams for explaining configurations of a host 4, an IPSec host 5 and a name management device 3, respectively.

FIG. 2A is a diagram for explaining a configuration of the host 4. The host 4 comprises: a main storage memory (hereinafter, referred to as a main memory) 401; a communication line 402 such as a bus; a storage unit (hereinafter, referred to as a magnetic disk) 403 having a hard disk drive, a DVD, or the like; a central processing unit (hereinafter, referred to as a CPU) 404; an output device (hereinafter, referred to as a display) 405 such as a display device; a pointing device 406 such as a mouse; a character input device 407 such as a keyboard; a network interface (hereinafter, referred to as an NIF) 408 as an interface for connecting the host 4 to the communication line 10; and a management NIF 409 as an interface for connecting the host 4 to the communication line 11.

The main memory 401 stores an iSCSI processing program 420 to be executed by the CPU 404 to perform operation as an initiator, an iSCSI name registration program 421 to be executed by the CPU 404 to register an iSCSI name of the initiator to the name management device 3, a discovery program 422 to be executed by the CPU 404 to discover a target of the storage device 1, and a configuration sending program 423 to be executed by the CPU 404 to send configuration information such as the iSCSI name of the iSCSI initiator to the storage management device 2.

The magnetic disk 403 has a configuration storing area 430 as an area which stores the configuration information.

Figure 2B:
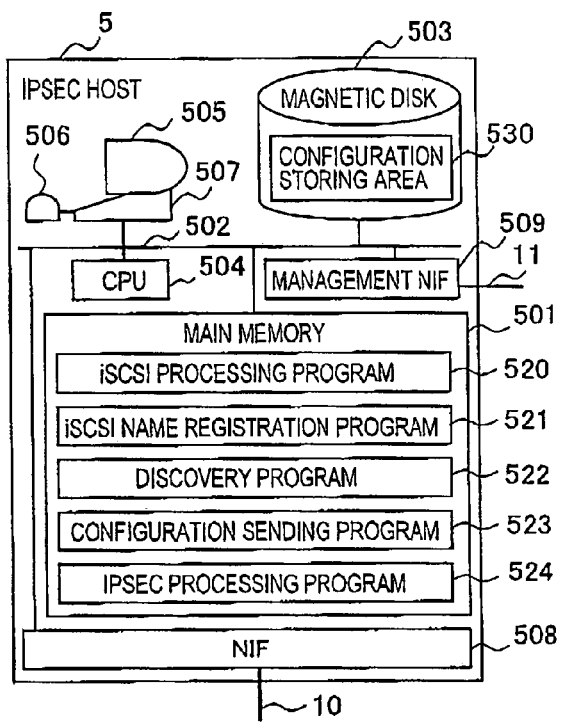

FIG. 2B is a diagram for explaining a configuration of the IPSec host 5. The IPSec host 5 comprises a main memory 501, a communication line 502, a magnetic disk 503, a CPU 504, a display 505, a pointing device 506, a character input device 507, an NIF 508 for connecting the communication line 10 and a management NIF 509 for connecting the communication line 11.

The main memory 501 stores an iSCSI processing program 520, an iSCSI name registration program 521, a discovery program 522, a configuration sending program 523 and an IPSec processing program 524 to be executed by the CPU 504 to perform IPSec processing.

The magnetic disk 503 has a configuration storing area 530.

Figure 2C:
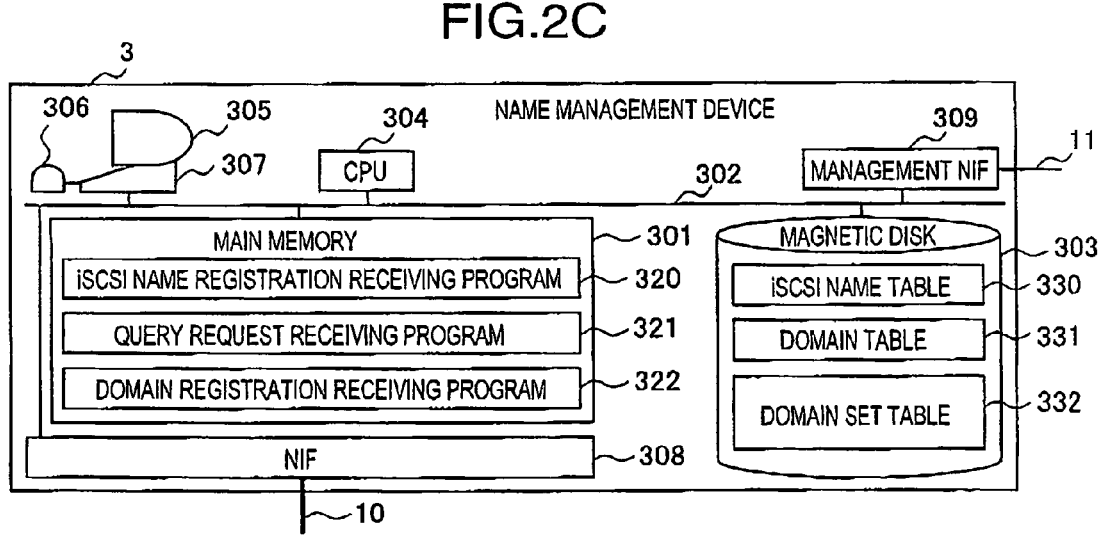

FIG. 2C is a diagram for explaining a configuration of the name management device 3. The name management device 3 comprises a main memory 301, a communication line 302, a magnetic disk 303, a CPU 304, a display 305, a pointing device 306, a character input device 307, an NIF 308 for connecting the communication line 10 and a management NIF 309 for connecting the communication line 11.

The main memory 301 stores an iSCSI name registration receiving program 320 to be executed by the CPU 304 to receive an iSCSI name registration request and to store the contents of the request into a table, a query request receiving program 321 to be executed by the CPU 304 to receive a query request relating to an iSCSI name, a discovery domain and a discovery domain set, to search the table according to the contents of the request and to return a search result, and a domain registration receiving program 322 to be executed by the CPU 304 to receiving a request for registration of a discovery domain or a discovery domain set and to store the contents of the request into a table.

Here, a discovery domain is a set of an initiator and targets that can be logged in by those initiators. When an initiator inquires of the name management device 3 iSCSI names of targets that the initiator can log in, then the name management device 3 returns iSCSI names of all the targets that belong to the same discovery domain as the initiator.

Further, a discovery domain set is a set of discovery domains. For example, discovery domains of a same business department or a same job may be grouped to generate a discovery domain set.

Information on a discovery domain (such as a name of the discovery domain, a name of an iSCSI node belonging to the discovery domain, and the like) is registered at the name management device 3 before boot of the iSCSI node. This is done in order that targets can be discovered when an initiator is booted.

The magnetic disk 303 stores an iSCSI name table 336 which stores information such as iSCSI name of initiators and targets and the like, a domain table 331 which stores information such as names of discovery domains and the like, and a domain set table 332 which stores information such as names of discovery domain sets and the like.

Figure 3:
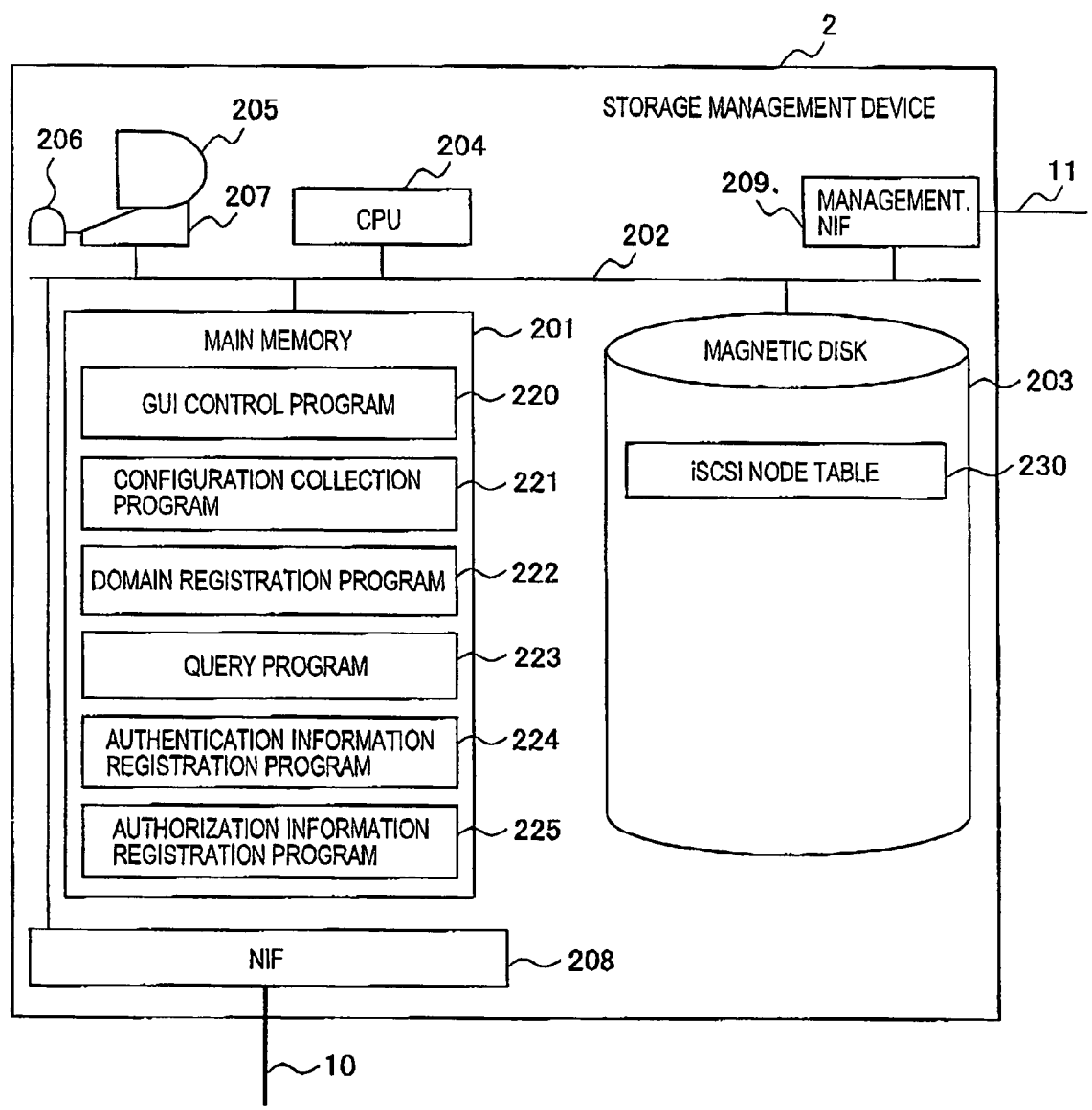
FIG. 3 is a diagram for explaining a configuration of a storage management device 2.

FIG. 3 is a diagram for explaining a configuration of the storage management device 2. The storage management device 2 comprises a main memory 201, a communication line 202, a magnetic disk 203, a CPU 204, a display 205, a pointing device 206, a character input device 207, an NIF 208 for connecting the communication line and a management NIF 209 for connecting the communication line 11.

The main memory 201 stores: a GUI control program 220 to be executed by the CPU 204 to provide a system administrator or the like with graphical user interfaces; a configuration collection program 221 to be executed by the CPU 204 to collect configuration information such as iSCSI names from the host 4, the IPSec host 5 and the storage device 1; a domain registration program 222 to be executed by the CPU 204 to send the name management device 3 a request for registration of a discovery domain or a discovery domain set; a query program 223 to be executed by the CPU 204 to send the name management device 3 a query request for inquiring an iSCSI name of an iSCSI node belonging to a discovery domain or discovery domains belonging to a discovery domain set; an authentication information registration program 224 to be executed by the CPU 204 to send authentication information to the storage device 1; and an authorization information registration program 225 to be executed by the CPU 204 to send authorization information to the storage device 1.

The magnetic disk 203 has an iSCSI node table 230 to store information such as a management IP address of an iSCSI node.

Figure 4:
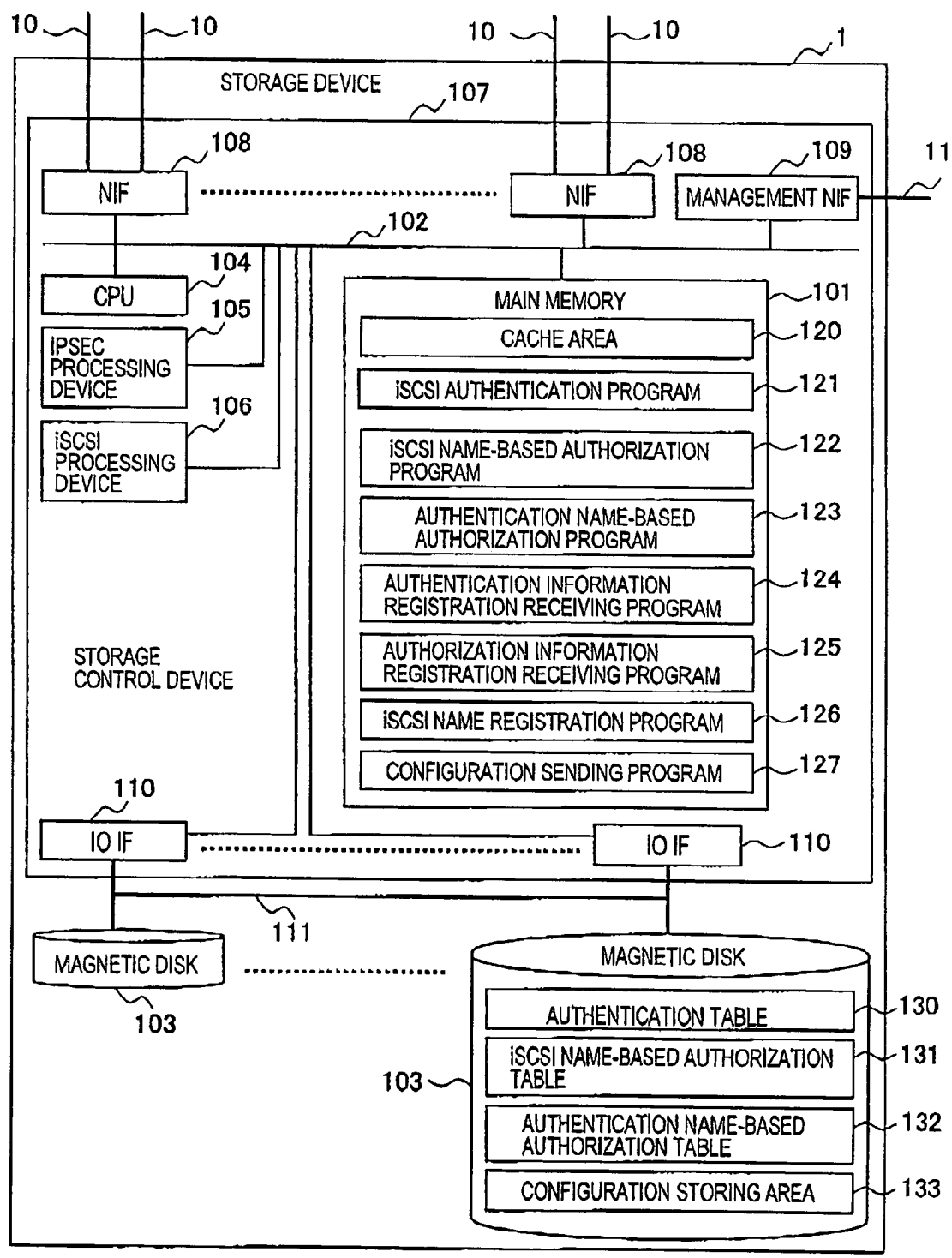
FIG. 4 is a diagram for explaining a configuration of a storage device 1.

FIG. 4 is a diagram for explaining a configuration of the storage device 1. The storage device 1 comprises a magnetic disk 103, a storage control device 107 for controlling write and read to and from the magnetic disk 103, and a communication line 111 for connecting the storage control device 107 and the magnetic disk 103.

The storage control device 107 comprises a main memory 101, a communication line 102, a CPU 104, an IPSec processing device 105 for executing protocol processing of IPSec, an iSCSI processing device 106 for executing protocol processing of iSCSI, an NIF 108 for connecting the communication line 10, a management NIF 109 for connecting the communication line 11, and an IO interface (hereinafter, referred to as an IO IF) 110 for connecting the storage control device 107 to the communication line 111. The storage control device 107 reads and writes data from and to the magnetic disk 103 through the IO IF 110 and the communication line 111.

The main memory 101 has a cache area 120 which stores data read from the magnetic disk 103. Further, the main memory 101 stores an iSCSI authentication program 121 to be executed by the CPU 104 to perform authentication processing in the iSCSI layer, an iSCSI name-based authorization program 122 to be executed by the CPU 104 to perform access acceptance/rejection judgment based on an iSCSI name of an initiator, an authentication name-based authorization program 123 to be executed by the CPU 104 to perform access acceptance/rejection judgment based on an authentication name, an authentication information registration receiving program 124 to be executed by the CPU 104 to receive authentication information from the storage management device 2 and to store the received information into a table, an authorization information registration receiving program 125 to be executed by the CPU 104 to receive authorization information from the storage management device 2 and to store the received information into a table, an iSCSI name registration program 126 to be executed by the CPU 104 to send the name management device 3 a request for registration of an iSCSI name of a target operating on the storage device 1, and a configuration sending program 127 to be executed by the CPU 104 to send the storage management device 2 configuration information such as an iSCSI name of a target operating on the storage device 1.

The magnetic disk 103 stores an authentication table 130 which stores an authentication name and authentication information corresponding to the authentication name, an iSCSI name-based authorization table 131 which stores correspondence between an iSCSI name of an initiator and an iSCSI name of a target that can be accessed from that initiator, and an authentication name-based authorization table 132 which stores correspondence between an authentication name of a user and an iSCSI name of an initiator or a target that can be used by that user. Further, the magnetic disk 103 has a configuration storing area 133.

The above-mentioned programs stored in the respective main memories 401, 501, 301, 201 or 101 of the host 4, the IPSec host 5, the name management device 3, the storage management device 2 and the storage device are previously read from a portable storage medium or downloaded from another computer through a network, and stored into the respective magnetic disks 403, 503, 303, 203 and 103. Each of these programs is transferred to the main memory 401, 501, 301, 201 or 101 and executed by the CPU 404, 504, 304, 204 or 104.

In all the embodiments given here, authentication processing in the iSCSI layer is performed between the host 4 and the storage device 1, and either authentication processing in the IPSec layer or authentication processing in the iSCSI layer is performed between the IPSec host 5 and the storage device 1. In the case where the IPSec host 5 can perform both the authentication processings, the system administrator or the like sets the iSCSI layer authentication method to "No Auth" (meaning that the authentication is not performed).

Next, data structures of various tables stored on the magnetic disk 103 of the storage device 1 will be described.

The authentication table 130, the iSCSI name-based authorization table 131 and the authentication name-based authorization table 132 have the array structure, and can store one or more records.

FIG. 5A is a diagram showing an example of the data structure of the authentication table 130.

Each record of the authentication table 130 includes an entry 1300 for registering an authentication type that identifies an authentication method, an entry 1301 for registering an authentication name, and an entry 1302 for registering authentication information that corresponds to the authentication name.

In the present embodiment, as the authentication method, is employed a method using CHAP (Challenge Handshake Authentication Protocol) in the iSCSI layer, or a method using a pre-shared key in the IPSec layer. "ipsec-chap" is registered in the entry 1300 when the authentication using CHAP is employed, and "iscsi-psk" is registered in the entry 1300 when the authentication using a pre-shared key is employed.

FIG. 5B is a diagram showing an example of the data structure of the iSCSI name-based authorization table 131.

Each record of the iSCSI name-based authorization table 131 includes an entry 1310 for registering an iSCSI name of an initiator, and an entry 1311 for registering an iSCSI name of a target that can be accessed by that initiator.

When there occurs a login request, then, according to the iSCSI-name based authorization program 122, the CPU 104 refers to the iSCSI name-based authorization table 131 to authorize the login request. Namely, when the combination of the initiator and the target of the login request coincides with a combination of an initiator and a target held in the iSCSI name-based authorization table 131, then the login request is authorized.

FIG. 5C is a diagram showing an example of the data structure of the authentication name-based authorization table 132.

Each record of the authentication name-based authorization table 132 includes an entry 1320 for registering an authentication type, an entry 1321 for registering an authentication name of a user, an entry 1322 for registering a node type that indicates whether an iSCSI node is an initiator or a target, and an entry 1323 for registering an iSCSI name of the iSCSI node that can be used by the user in question.

In the present embodiment, registration into the entry 1322 is made based on an iSCSI name registered in the entry 1323. Namely, when an iSCSI name registered in the entry 1323 is the name of an initiator, then "initiator" is registered in the entry 1322. On the other hand, when the iSCSI name is the name of an target, then "target" is registered in the entry 1322.

In the case where "initiator" is registered in the entry 1322, the iSCSI name registered in the entry 1323 is an iSCSI name of an initiator (a computer) whose use is permitted to the user having the authentication name registered in the entry 1321.

Further, in the case where "target" is registered in the entry 1322, the iSCSI name registered in the entry 1323 is an iSCSI name of a target (a storing area) that the user having the authentication name registered in the entry 1321 is permitted to access.

After the login request is authorized according to the above-mentioned iSCSI name-based authorization program 122, then, according to the authentication name-based authorization program 123, the CPU 104 refers to the authentication name-based authorization table 132 to perform authorization based on the authentication name. Namely, the authorization is performed by ascertaining whether the user having the authentication name registered in the entry 1321 is accessing a storing area (a target) that the user is permitted to access, through a computer (an initiator) that the user is permitted to use.

In the present embodiment, all the nodes are registered in the authentication name-based authorization table 132. However, a different table may be prepared for each node type. In that case, the entry 1322 of the authentication name-based authorization table 132 can be dispensed with. Obviously an iSCSI name registered in the entry 1323 is always an iSCSI name of a target, or always an iSCSI name of an initiator.

In the case where the entry 1323 stores an iSCSI name of a target only, then the authentication name-based authorization is performed by ascertaining only that a user having an authentication name registered in the entry 1321 is accessing through a computer (an initiator) that the user is permitted to use.

In the case where the authentication name-based authorization table 132 holds iSCSI names of only one type, it is possible to cope with personation of an iSCSI name of an initiator, when iSCSI names of targets only are held.

Thus, authorization processing can be performed if iSCSI names of either initiators or targets are held. However, sometimes, quantity of data to set can be reduced if the entry 1323 registers an iSCSI name of an initiator. Thus, the present embodiment is described taking an example where the authentication name-based authorization table 132 includes the entry 1322.

In detail, when one user "tanaka" uses one initiator "iqn.2003-12.com.abc:pc01" to access many targets, it is necessary to register the same number of records as the number of the targets in the authentication name-based authorization table 132 in the case where the entry 1323 registers an iSCSI names of a target. On the other hand, in the case where the entry 1323 registers an iSCSI name of an initiator, it is sufficient to register one record in the authentication name-based authorization table 132.

Further, the authentication name-based authorization table 132 may have a record with iSCSI names of an initiator and a target having the same authentication name registered in the entry 1321, associating those iSCSI names with each other. In detail, a combination of an authentication name as an identifier of a user, an authentication type, an iSCSI name as an identifier of an initiator that the user is permitted to use and an iSCSI name as an identifier of a target that the user can access may be registered as one record in the authentication name-based authorization table 132.

Next, a data structure of the iSCSI node table 230 stored in the magnetic disk 203 of the storage management device 2 will be described. The iSCSI node table 230 has the array structure and can store one or more records.

FIG. 6A is a diagram showing an example of the data structure of the iSCSI node table 230.

The iSCSI node table 230 holds one record for each iSCSI node that operates in the computer system of the present embodiment. Each record of the iSCSI node table 230 includes an entry 2300 for registering a node type that indicates whether the iSCSI node in question is an initiator or a target, an entry 2301 for registering an IP address assigned to a management NIF of the iSCSI node, and an entry 2302 for registering an iSCSI name of the iSCSI node.

In the present embodiment, when "initiator" is registered in the entry 2300, then it means that the iSCSI node registered in the record is an initiator. On the other hand, when "target" is registered in the entry 2300, then it means that the iSCSI node registered in the record is a target.

Next, data structures of various tables stored in the magnetic disk 303 of the name management device 3 will be described.

The iSCSI name table 330, the domain table 331 and the domain set table 332 have the array structure and can store one or more records.

FIG. 6B is a diagram showing an example of the data structure of the iSCSI name table 330.

The iSCSI name table 330 holds one record for each iSCSI node that operates in the computer system of the present embodiment. Each record of the iSCSI name table 330 includes an entry 3300 for registering an iSCSI name of an iSCSI node, an entry 3301 for registering a node type of the iSCSI node registered in the entry 3300, and entries 3302 and 3303 for respectively registering an IP address and a port number used when the iSCSI node in question communicates by iSCSI.

In the present embodiment, when "initiator" is registered in the entry 3301, it means that the iSCSI node registered in the record is an initiator. On the other hand, when "target" is registered in the entry 3301, it means that the iSCSI node is a target. In the present embodiment, in the case where an iSCSI node is an initiator, a TCP port number used for iSCSI communication is not determined, and thus, "0" is registered in the entry 3303.

FIG. 6C is a diagram showing an example of the data structure of the domain table 331.

Each record of the domain table 331 includes an entry 3310 for registering a domain name, i.e., a name of a discovery domain, and an entry 3311 for registering an iSCSI name of an iSCSI node that belongs to the discovery domain in question.

FIG. 6D is a diagram showing an example of the data structure of the domain set table 332.

Each record of the domain set table 332 includes an entry 3320 for registering a domain set name, i.e., a name of a discovery domain set, and an entry 3321 for registering a name of a discovery domain that belongs to the discovery domain set in question.

Next, graphical user interfaces (hereinafter, each graphical user interface is referred to as GUI) used in the present embodiment will be described. These GUIs are each displayed on the display 205 when the CPU 204 of the storage management device 2 executes the GUI control program 220. The system administrator or the like uses the character input device 207 or the pointing device 206 to set each parameter on a GUI displayed.

Here, the display 205, the character input device 207 and the pointing device 206 may be ones provided to another computer than the storage management device 2. For example, a console terminal, which is connected to the storage management device 2 through the management network 9 or a serial cable, may have the display. 205 etc. In that case, the CPU 204 executes the GUI control program 220 to send screen data to the console terminal, and then the console terminal display a GUI on its display 205. Further, the console terminal sends the storage management device 2 each parameter, which the system administrator or the like sets using the character input device 207 and the pointing device 206 of the console terminal.

Further, the storage management device 2 may be provided with command line interfaces having the same functions as the GUIs described in the present embodiment.

Figure 7:
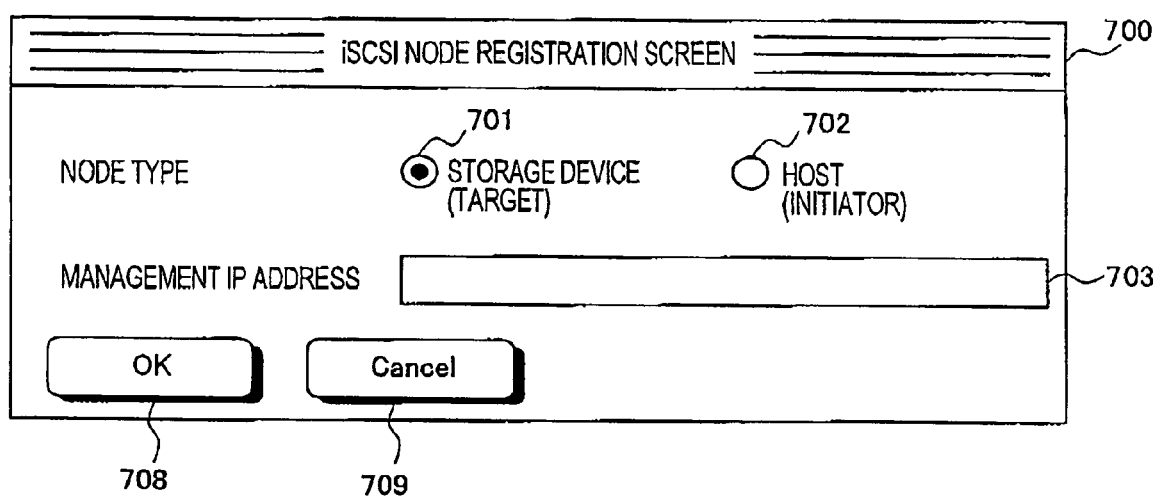
FIG. 7 is a diagram showing an example of display of an iSCSI node registration screen 700.

FIG. 7 is a diagram showing an example of display of an iSCSI node registration screen 700, which is displayed on the display 205 for receiving registration of information on an iSCSI node operating in the computer system of the present embodiment from the administrator or the like through the storage management device 2. An iSCSI node registered through this screen is stored into the iSCSI node table 230 to be used for domain name registration processing, iSCSI name-based authentication processing, authentication name-based authorization processing, or the like.

The iSCSI node registration screen 700 is provided with buttons 701 and 702 for receiving a node type of an iSCSI node to be registered. The button 701 receives selection of a target as the node type, and the button 702 selection of an initiator as the node type. Further, this screen 700 is provided with an area 703 for receiving input of a management IP address of the iSCSI node in question, a button 708 for receiving an instruction to register the information specified in those areas, and a button 709 for receiving an instruction to cancel the registration. Here, only one of the buttons 701 and 702 can be selected.

FIG. 8A is a diagram showing an example of display of a domain registration screen 800, which is displayed on the display 205 for receiving registration of information on a discovery domain from the system administrator or the like through the storage management device 2.

The domain registration screen 800 is provided with an area 801 for inputting a name of a discovery domain to be registered, an area 802 for inputting a name of a discovery domain set to which the discovery domain in question belongs, an area 803 for receiving selection of an initiator that belongs to that discovery domain, buttons 804 and 806 for receiving an instruction to move a display range of the area 803 upward and downward respectively, a button 805 for receiving an instruction to move the display range of the area 803 arbitrarily, an area 807 for receiving selection of a target that belongs to the discovery domain in question, buttons 808 and 810 for receiving an instruction to move a display range of the area 807 upward and downward respectively, a button 809 for receiving an instruction to move the display range of the area 807 arbitrarily, a button 818 for receiving an instruction to register the information specified in those areas, and a button 819 for receiving an instruction to cancel the registration.

The iSCSI name of initiators and targets displayed in the areas 803 and 807 are extracted from data that are collected according to the configuration collection program 221 and held in the iSCSI node table 230. Details of collecting operation will be described below.

It is possible to select a plurality of initiators and a plurality of targets using the area 803 and 807 respectively.

FIG. 8B is a diagram showing an example of display of an authentication information registration screen 820, which is displayed on the display 205 for receiving registration of authentication information of a user from the system administrator or the like through the storage management device 2.

The authentication information registration screen 820 is provided with a button 822 for receiving selection of a authentication method, an area 821 for displaying the authentication method selected using the button 822, an area 823 for inputting an authentication name of a user, an area 824 for inputting authentication information corresponding to the authentication name, a button 825 for receiving an instruction of reading the authentication information corresponding to the authentication name from a file, a button 828 for receiving an instruction to register the information specified in those areas, and a button 829 for receiving an instruction to cancel the registration.

Authentication methods supported by the present computer system are registered in advance in the storage management device 2. The registered authentication methods are displayed in the area 821 for receiving selection of an authentication method, and a user can select a desired authentication method among them using the button 822.

Figure 9A:
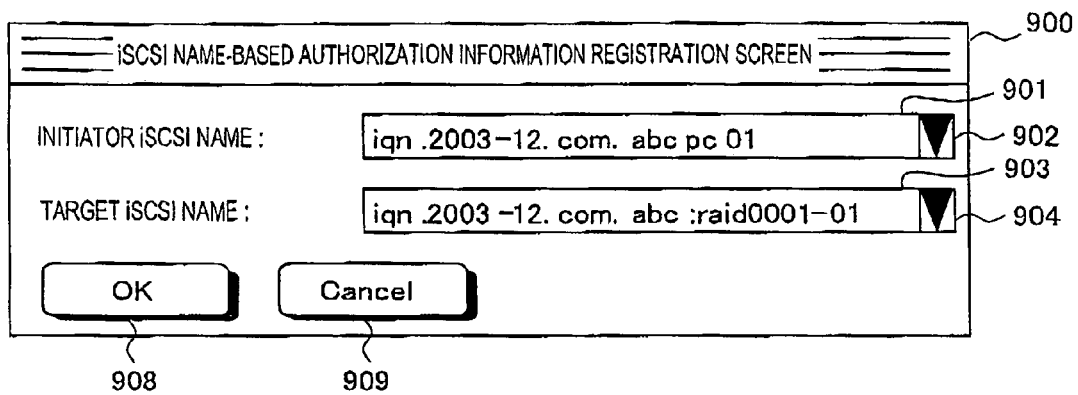
FIG. 9A is a diagram showing an example of display of an iSCSI name-based authorization information registration screen 900.

FIG. 9A is a diagram showing an example of display of an iSCSI name-based authorization information registration screen 900, which is displayed on the display 205 for receiving registration of a combination of iSCSI names of an initiator and a target that the initiator in question can access, from the system administrator or the like through the storage management device 2.

The iSCSI name-based authorization information registration screen 900 is provided with a button 902 for receiving selection of an iSCSI name of an initiator, an area 901 for displaying the iSCSI name selected by the button 902, a button 904 for receiving selection of an iSCSI name of a target, an area 903 for displaying the iSCSI name selected by the button 904, a button 908 for receiving an instruction to register information specified in those areas, and a button 909 for receiving an instruction to cancel the registration.

Here, the iSCSI names held in the iSCSI node table 230 are displayed as iSCSI names of initiators and targets that can be selected by the buttons 902 and 904 on this screen.

Figure 9B:
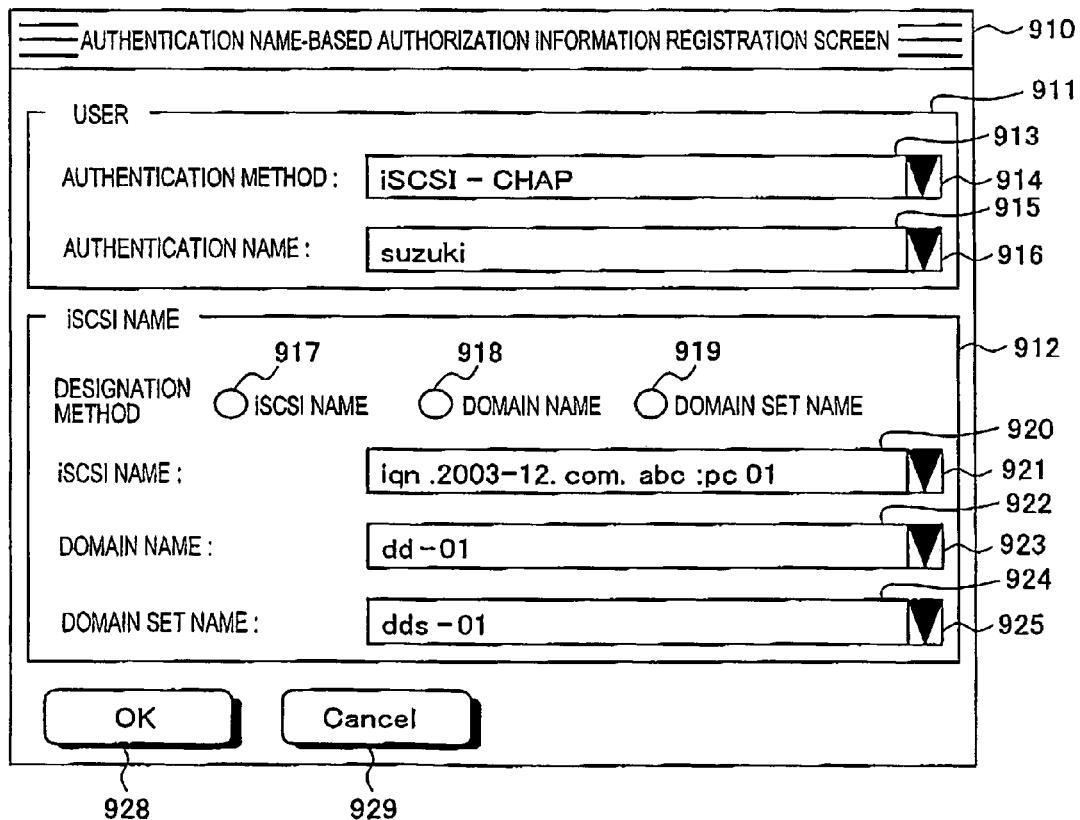
FIG. 9B is a diagram showing an example of display of an authentication name-based authorization information registration screen 910.

FIG. 9B is a diagram showing an example of display of an authentication name-based authorization information registration screen 910, which is displayed on the display 205 for receiving registration of a combination of an authentication name of a user and an iSCSI node that the user can use, from the system administrator or the like through the storage management device 2.

The authentication name-based authorization information registration screen 910 is provided with an area 911 for receiving an instruction to select information on a user, an area 912 for receiving an instruction to select an iSCSI node that the user selected in the area 911 can use, a button 928 for receiving an instruction to register the information specified in those areas, and a button 929 for receiving an instruction to cancel the registration.

Further, the area 911 is provided with a button 914 for receiving selection of an authentication method out of authentication methods that are registered in advance as selectable methods, an area 913 for displaying the authentication method selected by the button 914, a button 916 for receiving selection of an authentication name out of authentication names registered using the authentication information registration screen 820, and an area 915 for displaying the authentication name selected by the button 916.

Further, the area 912 is provided with buttons 917, 918 and 919 for receiving selection of a method of designating an iSCSI node that the user can use. Here, selection of the button 917 means reception of designation of an iSCSI node by means of an iSCSI name, the button 918 by means of a discovery domain name, and the button 919 by means of a discovery domain set name. Only one of the buttons 917, 918 and 919 can be selected.

Further, the area 912 is provided with a button 921 for receiving selection of an iSCSI name of the iSCSI node when the button 917 is selected, an area 920 for displaying the iSCSI name selected by the button 921, a button 923 for receiving selection of a discovery domain name when the button 918 is selected, an area 922 for displaying the discovery domain name selected by the button 923, a button 925 for receiving selection of a discovery domain set name when the button 919 is selected, and an area 924 for displaying the discovery domain set name selected by the button 925.

Here, information of selectable iSCSI names is acquired from the iSCSI node table 230 held by the storage management device 2 and the acquired iSCSI names are displayed. Further, selectable discovery domain names and discovery domain set names are acquired respectively from the domain table 331 and the domain set table 332 of the name management device 3 and displayed.

Next, an outline of operation of the computer system of the present embodiment will be described. First, using the storage management device 2, the administrator or the like registers information on iSCSI nodes and information on discovery domains and discovery domain sets, into the computer system. At that time, the administrator or the like registers information through the display screens shown in FIGS. 7 and 8A. Then the information of the iSCSI nodes is stored in the storage management device 2, while the information of the discovery domain sets and the discovery domains is stored in the name management device 3.

Next, using the storage management device 2, the administrator or the like registers authentication information, iSCSI name-based authorization information and authentication name-based authorization information, into the computer system. At that time, the administrator or the like registers information through the display screens shown in FIGS. 8B and 9. These pieces of authorization information etc. are stored in the storage device 1. Further, at that time, the administrator or the like can specify targets that become objects of authorization, by designating an iSCSI name of each target, discovery domain name or discovery domain set name. Thus, it is possible to set a plurality of targets in one lump for a user (an authentication name), lightening a burden on the administrator or the like at the time of setting Particularly, when discovery domains or discovery domain sets are classified by job specifications or the like, then, by designating a discovery domain or a discovery domain set, the administrator or the like can collectively designate targets included in that discovery domain or discovery domain set, only for a person concerned with jobs corresponding to that discovery domain or discovery domain set.

Thereafter, the storage device 1 activates the targets and registers iSCSI names of the targets to the name management device 3.

Further, when the host 4 or the IPSec host 5 activates an initiator, then the host 4 or the IPSec host 5 registers an iSCSI name of the initiator activated by the host 4 or the IPSec host 5 itself to the name management device 3 to log in the storage device 1.

The storage device 1 performs authentication and authorization of the initiator that logs in the storage device 1, to judge whether access to the target should be accepted.

Acceptance or rejection of access is judged according to the following procedure.

In order that the host 4 or the IPSec host 5 activates an initiator and accesses a target LU of the storage device 1, which the host 4 or the IPSec host 5 itself is permitted to access, the host 4 or the IPSec host 5 sends a login request and an authentication request to the storage device 1. At that time, similarly to the conventional technique, the host 4 or the IPSec host 5 sends the iSCSI name of the initiator, the iSCSI name of the target, the authentication name and the authentication information to the storage device 1.

Similarly to the conventional technique, when the storage device 1 receives these pieces of information, the storage device 1 confirms validity of a combination of the iSCSI names of the initiator and the targets referring to the iSCSI name-based authorization table 131, and confirms validity of a combination of the authentication name and the authentication information referring to the authentication table 130.

Further, in the present invention, the storage device 1 refers to the authentication name-based authorization table 132 to confirm, for example, a combination of the authentication name and the iSCSI name of the initiator and/or a combination of the authentication name and the iSCSI name of the target.

Consequently, according to the present embodiment, in the case where the validity is confirmed using the authentication name and the iSCSI name of the initiator referring to the authentication name based authorization table 132, access to the storage device 1 is permitted only when a valid user uses the host 4 or the IPSec host 5. Further, in the case where the validity is confirmed using the authentication name and the iSCSI name of the target, access is permitted only when a valid user permitted to access the target LU in question accesses the storage device 1.

In the following, flowcharts showing communication sequences between various devices and operation of various devices in the present embodiment will be described.

FIG. 10 is a diagram showing an example of a sequence of communication between devices at the time when the storage management device 2 registers information of an iSCSI node, a discovery domain and a discovery domain set according to an instruction from the system administrator or the like.

Here, description will be given taking an example of an initiator operating on the host 4. The present processing can be applied similarly to the case of an initiator operating on the IPSec host 5.

The host 4 and the storage device 1 are connected to the IP-SAN 8 and the management network 9. Further, it is assumed that, in the host 4, setting of the initiator has been finished, and the iSCSI name, the IP address, the authentication name and the authentication information of the initiator have been stored in the configuration storing area 430. Further, it is assumed that, in the storage device 1, setting of the target has been finished and the iSCSI name, the IP address and the TCP port number of the target have been stored in the configuration storing area 133.

First, the CPU 204 of the storage management device 2 executes the GUI control program 220 to perform iSCSI node registration screen display processing for displaying the iSCSI node registration screen 700 on the display 205 (S1001).

When a push of the button 708 by the system administrator or the like is received in the iSCSI node registration screen 700, then the CPU 204 executes the configuration collection program 221 of the storage management device 2 to perform iSCSI name collection processing (S1002).

This processing collects an iSCSI name of the designated IP address. First, the CPU 204 sends a configuration sending request toward the IP address inputted in the area 703, through the management NIF 209.

In the case where the IP address assigned to the management NIF 409 of the host 4 is inputted in the area 703, then the CPU 204 sends the configuration sending request to the host 4 (S1003). When the host 4 receives the configuration sending request, the CPU 404 of the host 4 executes the configuration sending program 423 to compose a configuration sending response based on the configuration information read from the configuration storing area 430 and to send the composed response to the storage management device 2 (S1004).

On the other hand, in the case where the IP address assigned to the management NIF 109 of the storage device 1 is inputted in the area 703, then the CPU 204 sends a configuration sending request to the storage device 1 (S1005). When the storage device 1 receives the configuration sending request, then the CPU 104 executes the configuration sending program 127 to compose a configuration sending response based on the configuration information read from the configuration storing area 133 and to send the composed response to the storage management device 2 (S1006).

When the storage management device 2 receives the configuration sending response from the host 4 or the storage device 1, then the CPU 204 extracts the iSCSI name from the configuration sending response. And the CPU 204 adds a record to the iSCSI node table 230.

"Target" is registered in the entry 2300 of the added record when the button 701 has been selected in the iSCSI node registration screen 700 of Step 1002, or "Initiator" when the button 702 has been selected.

Further, the IP address inputted in the area 703 registered in the entry 2301 of the record in question, and the iSCSI name extracted from the configuration sending response is registered in the entry 2302.

Next, the CPU 204 of the storage management device 2 executes the GUI control program 220 to perform domain registration screen display processing for displaying the domain registration screen 800 on the display 205 (S1007).

When a push of the button 818 is received from the system administrator or the like in the domain registration screen 800, then the CPU 204 of the storage management device 2 executes the domain registration program 222 to perform domain set registration processing (S1008).

In this processing, the CPU 204 composes a domain set registration request based on the discovery domain set name inputted in the area 802 and the discovery domain name inputted in the area 801, and sends the composed request to the name management device 3 through the management NIF 209 (S1009).

When the name management device 3 receives the domain set registration request, then the CPU 304 of the name management device 3 executes the domain registration receiving program 322 to perform domain set registration processing (S1010).

In this processing, the CPU 304 extracts the names of the discovery domain set and the discovery domain from the domain set registration request, and adds a record containing these names respectively in its entries 3320 and 3321 to the domain set table 302. Then the CPU 304 sends a domain set registration response to the storage management device 2 through the management NIF 309, to report the success of the registration of the discovery domain set (S1011).

When the storage management device 2 receives the domain set registration response, the CPU 204 executes the domain registration program 222 to perform domain registration processing (S1012).

In this processing, the CPU 204 composes a domain registration request based on the discovery domain name inputted in the area 801, the initiator's iSCSI name selected in the area 803 and the target's iSCSI name selected in the area 807, and sends the composed request to the name management device 3 through the management NIF 209 (S1013).

When the name management device 3 receives the domain registration request, then the CPU 304 executes the domain registration receiving program 322 to perform domain registration processing (S1014).

In this processing, first the CPU 304 extracts the name of the discovery domain and the iSCSI names of the initiator and the target from the domain registration request. Then the CPU 304 adds a record containing the name of the discovery domain and the iSCSI name of the initiator respectively in its entries 3310 and 3311 to the domain table 331. Further, the CPU 304 adds a record containing the name of the discovery domain and the iSCSI name of the target respectively in its entries 3310 and 3311 to the domain table 331.

Then the CPU 304 sends a domain registration response to the storage management device 2 through the management NIF 309, to report the success of the registration of the discovery domain (S1015).

After receiving the domain registration response, the storage management device 2 may add a record to the iSCSI name-based authorization table 131, based on the information inputted in FIG. 8.

In detail, for each combination of an initiator designated in the area 803 and a target designated in the area 807, an iSCSI name-based authorization information registration request is composed based on the iSCSI names of the initiator and the target, to send the composed request to the storage device 1. The storage device 1 extracts the iSCSI names of the initiator and the target out of the iSCSI name-based authorization information registration request, and returns respective iSCSI name-based authorization information registration responses. As a result, it is possible to omit the below-described operation (S1106-S1110) of registering a record into the iSCSI name-based authorization table using the iSCSI-name based authorization information registration screen 900.

Figure 11:
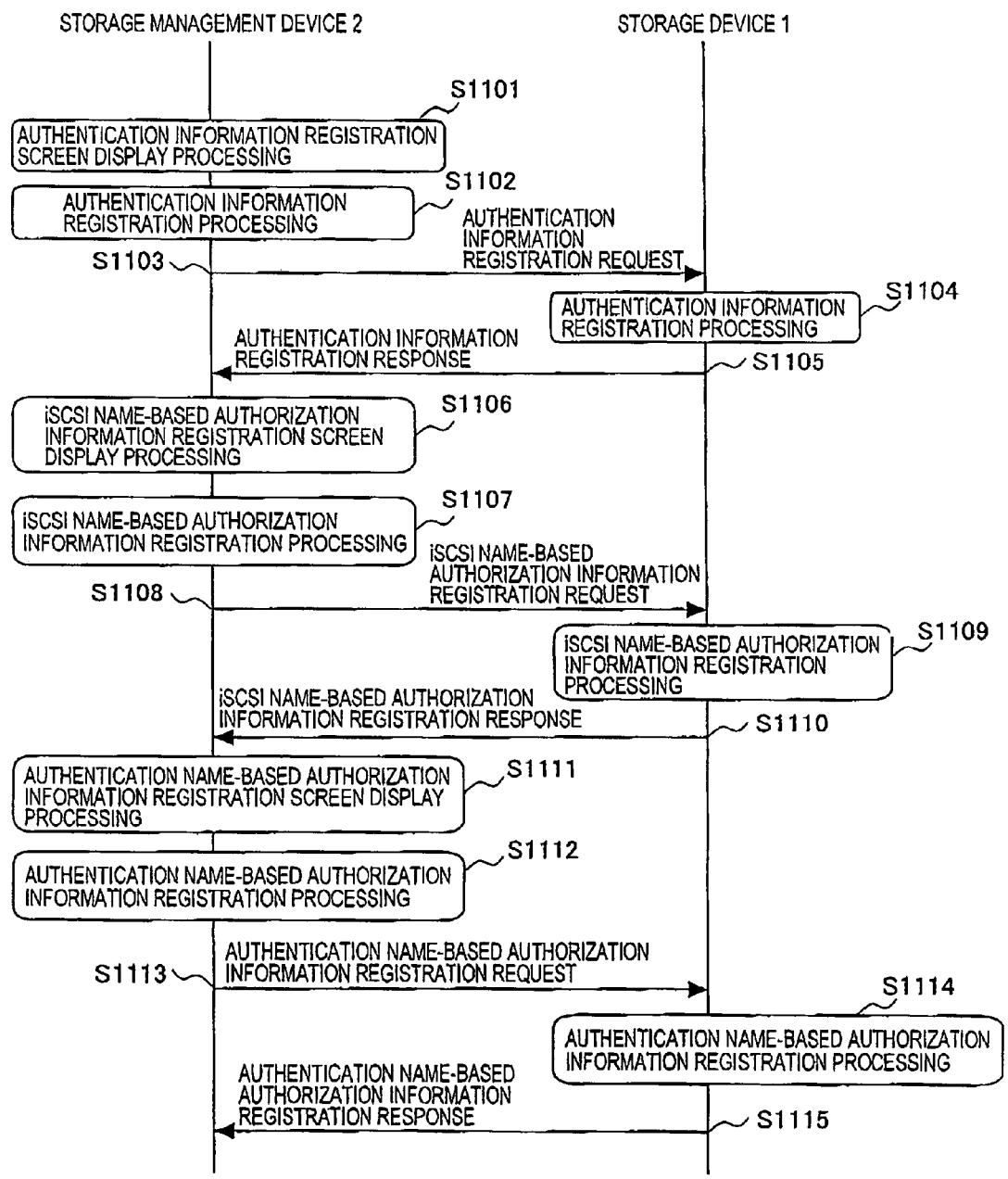
FIG. 11 is a diagram showing an example of a sequence of communication between devices at the time of registering authentication information, iSCSI name-based authorization information and authentication name-based authorization information.

FIG. 11 is a diagram showing an example of a sequence of communication between devices at the time when the storage management device 2 registers authentication information, iSCSI name-based authorization information and authentication name-based authorization information according to an instruction of the system administrator or the like.

First, the CPU 204 of the storage management device 2 executes the GUI control program 220 to perform authentication information registration screen display processing for displaying the authentication information registration screen 820 on the display 205 (S1101).

When a push of the button 828 is received from the system administrator or the like in the authentication information registration screen-820, the CPU 204 of the storage management device 2 executes the authentication information registration program 224 to perform authentication information registration processing (S1102).

In this processing, the CPU 204 composes an authentication information registration request based on the authentication method selected by the button 822, the authentication name inputted in the area 823 and the authentication information inputted in the area 824, and sends the composed request to the storage device 1 through the management NIF 209 (S1103).

When the storage device 1 receives the authentication information registration request, the CPU 104 executes the authentication information registration receiving program 124 to perform authentication information registration processing (S1104).

In this processing, the CPU 104 extracts the authentication method, the authentication name and the authentication information from the authentication information registration request, and adds a record containing these pieces of information respectively in the entries 1300, 1301 and 1302 to the authentication table 130. Then the CPU 104 sends an authentication information registration response to the storage management device 2 through the management NIF 109, to report the success of the registration of the authentication information (S1105).

Next, the CPU 204 of the storage management device 2 executes the GUI control program 220 to perform iSCSI name-based authorization information registration screen display processing to display the iSCSI name-based authorization information registration screen 900 on the display 205 (S1106).

When a push of the button 908 is received from the system administrator or the like in the iSCSI name-based authorization information registration screen 900, the CPU 204 of the storage management device 2 executes the authorization information registration program 225 to perform iSCSI name-based authorization information registration processing (S1107).

In this processing, the CPU 204 composes an iSCSI name-based authorization information registration request based on the initiator's iSCSI name selected by the button 902 and the target's iSCSI name selected by the button 904, and sends the composed request to the storage device 1 through the management NIP 209 (S1108).

When the storage device 1 receives the iSCSI name-based authorization information registration request, then the CPU 104 executes the authorization information registration receiving program 125 to perform iSCSI name-based authorization information registration processing (S1109).

In this processing, the CPU 104 extracts the iSCSI names of the initiator and the target from the iSCSI name-based authorization registration request, and adds a record containing these iSCSI names respectively in the entries 1310 and 1311 to the iSCSI name-based authorization table 131. Then the CPU 104 sends an iSCSI name-based authorization information registration response to the storage management device 2 through the management NIF 109, to report the success of the registration of the iSCSI name-based authorization information (S1110).

Next, the CPU 204 of the storage management device 2 executes the GUI control program 220 to perform authentication name-based authorization information registration screen display processing for displaying the authentication name-based authorization information registration screen 910 on the display 205 (S1111). When a push of the button 928 is received from the system administrator or the like in the authentication name-based authorization information registration screen 910, then the CPU 204 of the storage management device 2 executes the authorization information registration program 225 to perform authentication name-based authorization information registration processing (S1112). Details of the authentication name-based authorization information registration processing will be described later.

The CPU 204 composes an authentication name-based authorization information registration request based on the iSCSI node list acquired as a result of this processing, the authentication method selected by the button 914 and the authentication name selected by the button 916, and sends the composed request to the storage device 1 through the management NIF 209 (S1113).

Here, the iSCSI node list is a list of a type (an initiator or a target) and an iSCSI name of an iSCSI node that the user having the authentication name designated in the area 915 can use.

When the storage device 1 receives the authentication name-based authorization information registration request, then the CPU 104 executes the authorization information registration receiving program 125 to perform authentication name-based authorization information registration processing (S1114).

In this processing, first the CPU 104 extracts the iSCSI node list, the authentication method and the authentication name from the authentication name-based authorization information registration request. Then, for each iSCSI name included in the iSCSI node list, the CPU 104 adds a record to the authentication name-based authorization table 132.

With respect to each record added here, the authentication method, the authentication name, the node type and the iSCSI name are registered in the 1320, 1321, 1322 and 1323, respectively. Then the CPU 104 sends an authentication name-based authorization information registration response to the storage management device 2 through the management NIF 109, to report the success of the registration of the authentication name-based authorization information (S1115).

Figure 12:
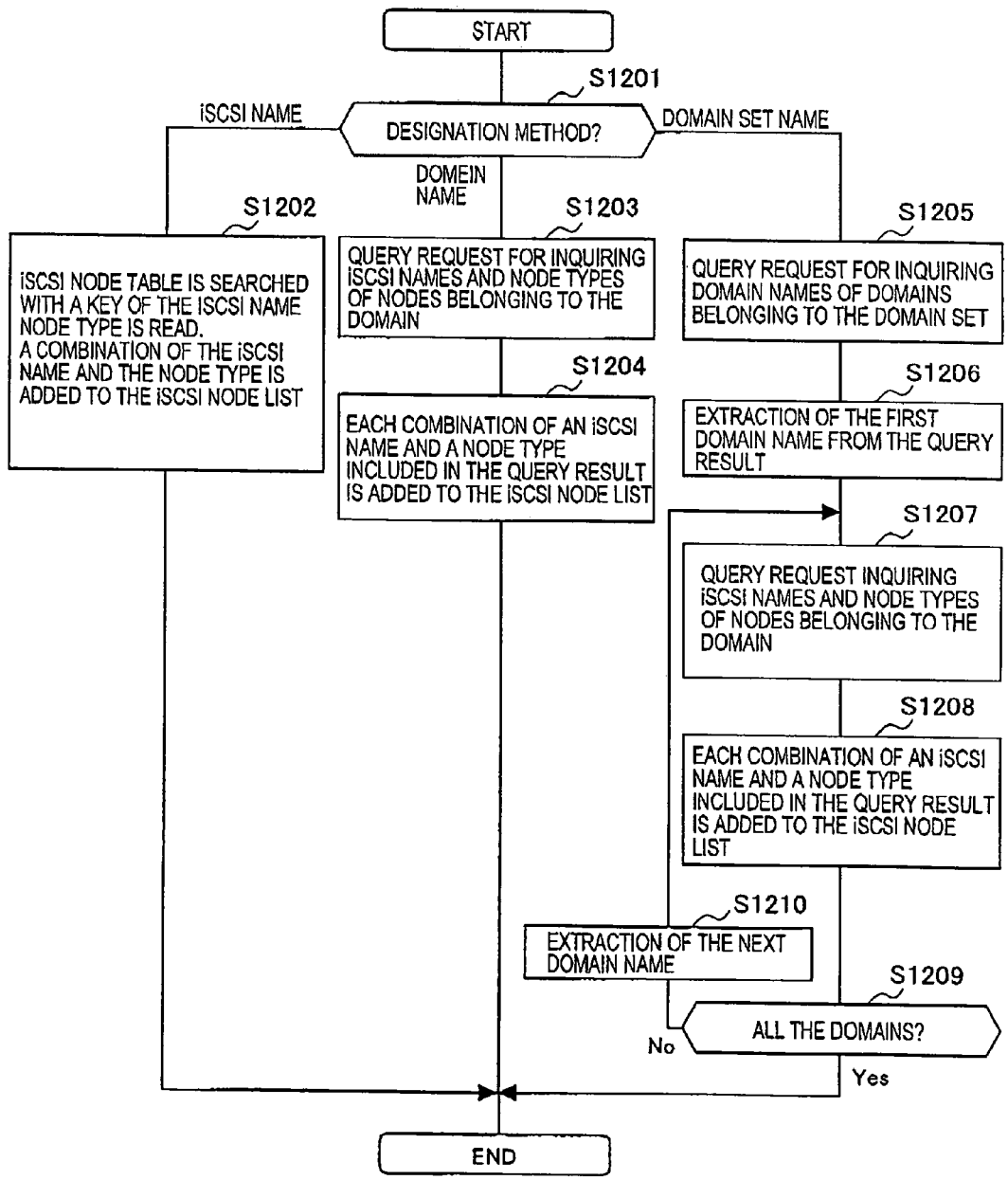
FIG. 12 is a flowchart showing an operating procedure of authentication name-based authorization information registration processing.

FIG. 12 is a flowchart showing an operating procedure of the authentication name-based authorization information registration processing described in S1112-S1114 of FIG. 11.

First, the CPU 204 branches the processing according to the iSCSI node designation method received from the system administrator or the like through the authentication name-based authorization information registration screen 910 (S1201).

First, processing performed in the case where selection of the button 917 is received (i.e., designation by an iSCSI name is selected) will be described.

The CPU 204 searches the iSCSI node table 230 for a record having the entry 2302 whose content coincides with the iSCSI name of the iSCSI node selected by the button 921, and retrieves the relevant record. Then, the node type registered in the entry 2300 of the retrieved record is extracted. Then, a combination of the iSCSI name selected by the button 921 and the extracted node type is added to the iSCSI node list to be sent to the storage device 1 in the step S1113, and the processing is ended (S1202).

Here, in the case where both an initiator and a target are registered to the authentication name based authorization table 132, each iSCSI name is individually selected by the button 921 in the authentication name-based authorization information registration screen 910, and the processing of the above step S1202 is performed for each iSCSI name.

Otherwise, when the node type extracted in S1202 indicates the initiator, it is possible to access the iSCSI name-based authorization table 131 to extract iSCSI names of targets corresponding to the iSCSI name selected by the button 921. And when the node type indicates the target, iSCSI names of corresponding initiators can be extracted from the iSCSI name-based authorization table 131.

Secondly, processing performed in the case where selection of the button 918 is received (i.e., designation by a discovery domain name is selected) will be described.

The CPU 204 first composes a query request for inquiring iSCSI names and node types of iSCSI nodes belonging to the discovery domain selected by the button 923, and sends the composed request to the name management device 3 through the management NIF 209 (S1203). Next, the CPU 204 receives a query response from the name management device 3, and adds combinations of an iSCSI name and a node type included in the query response to the iSCSI node list to end the processing (S1204).

Thirdly, processing performed in the case where selection of the button 919 is received (i.e., designation by a discovery domain set name is selected) will be described.

The CPU 204 first composes a query request for inquiring names of discovery domains that belong to the discovery domain set selected by the button 925, and sends the composed request to the name management device 3 through the management NIF 209 (S1205). Next, the CPU 204 receives a query response from the name management device 3, and extracts the first discovery domain name from the query response (S1206).

Then the CPU 204 composes a query request for inquiring iSCSI names and node types of iSCSI nodes that belongs to the discovery domain in question, and sends the composed request to the name management device 3 through the management NIF 209 (S1207). Receiving a query response from the name management device 3, the CPU 204 adds combinations of an iSCSI name and a node type included in the query response to the iSCSI node list (S1208).

Next, the CPU 204 judges whether the processing of S1207 and S1208 has been executed for all the discovery domain names included in the query response received in S1206 (S1209). When all the discovery domain names have been dealt with, the processing is ended. On the other hand, when a discovery domain name still to be dealt with is found in the step S1209, the next discovery domain name included in the query response received in S1206 is extracted (S1210), and the processing is repeated from S1207 through S1209.

Figure 13:
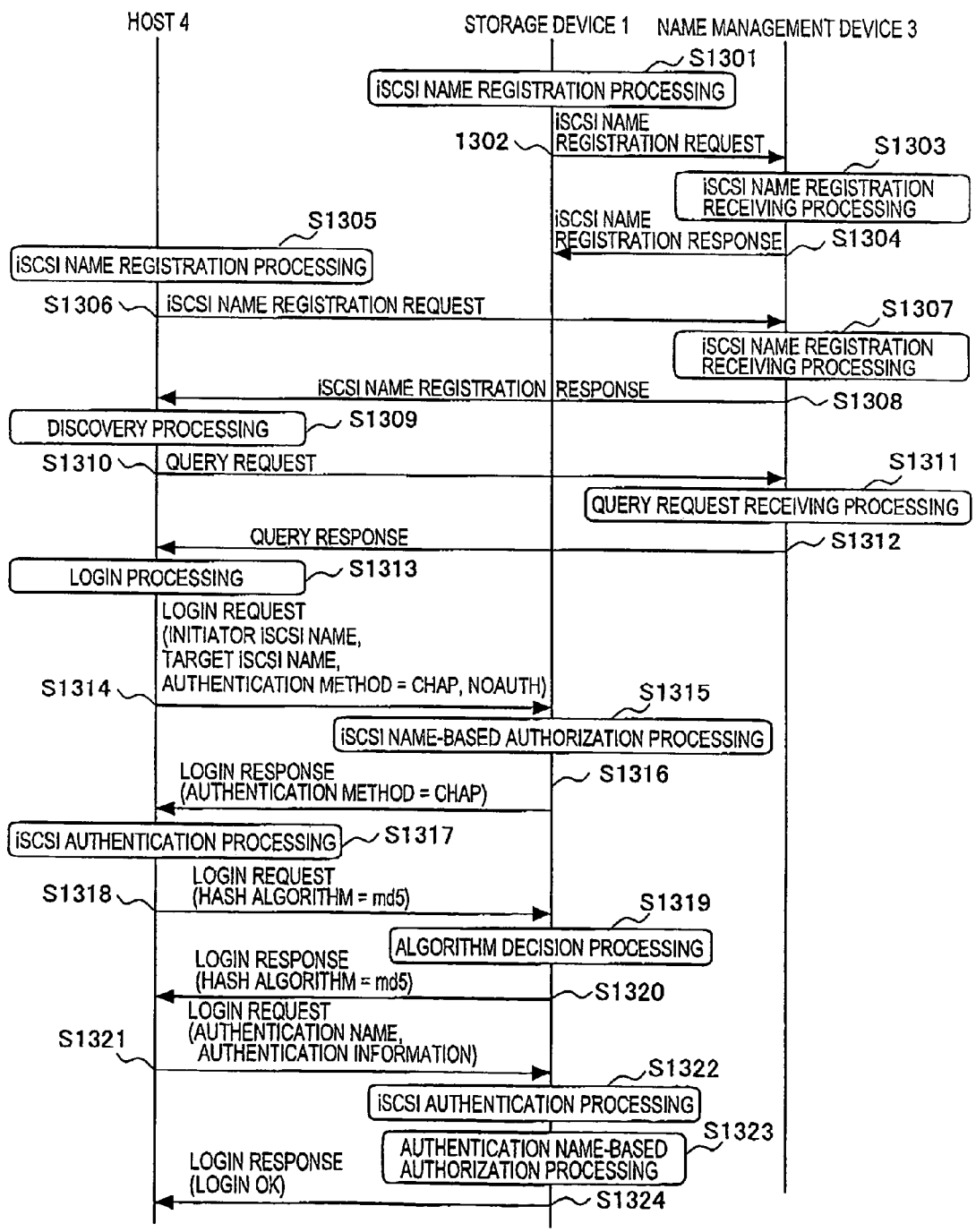
FIG. 13 is a diagram showing an example of a sequence of communication between devices at the time when the host 4 logs in the storage device 1.

FIG. 13 is a diagram showing an example of a sequence of communication between devices at the time when the host 4 logs in the storage device 1.

First, according to an instruction of the system administrator or the like, the storage management device 2 or the like sets an iSCSI target that operates on the storage device 1. Then the CPU 104 of the storage device 1 executes the iSCSI name registration program 126 to perform iSCSI name registration processing (S1301).

In this processing, the CPU 104 composes an iSCSI name registration request based on pieces of information stored in the configuration storing area 133, namely, the iSCSI name of the target, information indicating that the type of the iSCSI node is a target, the IP address and the TOP port number, and sends the composed request to the name management device 3 through the management NIF 109 (S1302).

When the name management device 3 receives the iSCSI name registration request, the CPU 304 executes the iSCSI name registration receiving program 320 to perform iSCSI name registration receiving processing (S1303).

In this processing, the CPU 304 extracts the iSCSI name, the IP address and the TCP port number of the target from the iSCSI name registration request, and adds a record containing these pieces of information respectively in the entries 3300, 3302 and 3303 and "target" in the entry 3301 to the iSCSI name table 330. Then the CPU 304 sends an iSCSI name registration response to the storage device 1 through the management NIF 309, to report the success of the registration of the iSCSI name (S1304).

Next, when, according to an instruction of the system administrator or the like, the host 4 makes the iSCSI initiator start operating, then the CPU 404 of the host 4 executes the iSCSI name registration program 421 to perform iSCSI name registration processing (S1305).

In this processing, the CPU 404 composes an iSCSI name registration request based on pieces of information stored in the configuration storing area 430, namely, the iSCSI name of the initiator, information indicating that the node type of the iSCSI node is the initiator, the IP address and information indicating that the TCP port number is "0", and sends the composed request to the name management device 3 through the management NIF 409 (S1306).

When the name management device 3 receives the iSCSI name registration request, then, similarly to S1303, the CPU 304 executes the iSCSI name registration receiving program 320 to perform iSCSI name registration processing (S1307).

In this processing, the CPU 304 extracts the iSCSI name and the IP address of the initiator from the iSCSI name registration request, and adds a record containing these pieces of information respectively in the entries 3300 and 3302 and "initiator" and "0" respectively in the entries 3301 and 3303 to the iSCSI name table 330. Then the CPU 304 sends an iSCSI name registration response to the host 4 through the management NIF 309, to report the success of the registration of the iSCSI name (S1308).

Next, the CPU 404 of the host 4 executes the discovery program 422 to perform discovery processing to acquire an iSCSI name, an IP address and a TCP port number of a target that the initiator operating on the host 4 can access (S1309).

In this processing, based on the initiator's iSCSI name stored in the configuration storing area 430, the CPU 404 composes a query request for inquiring an iSCSI name of a target that the initiator can discover, and sends the composed request to the name management device 3 through the management NIF 409 (S1310).

When the name management device 3 receives the query request, the CPU 304 executes the query request receiving program 321 to perform query request receiving processing (S1311).

In this processing, the CPU 304 first extracts the iSCSI name of the initiator, searches the domain table 331 for a record having the entry 3311 whose content coincides with the iSCSI name of the initiator, and extracts the content of the entry 3310 of the retrieved record (First Search). Then the content of the entry 3310 is the name of the discovery domain to which the initiator belongs.

Next, the CPU 304 searches the domain table 381 for records having the entry 3310 whose content coincides with the above-mentioned discovery domain name. And, among the retrieved records, the CPU 304 extracts a content of the entry 3311 of a record other than the record found in First Search (Second Search). Then this content of the entry 3311 is the iSCSI name of the target that belongs to the same discovery domain as the initiator in question.

Next, the CPU 304 searches the iSCSI name table 330 for a record having the entry 3300 whose content coincides with the iSCSI name of this target, and extracts the entries 3302 and 3303 of the retrieved record (Third Search). Then the contents of these entries are the IP address and the TCP port number of the target in question.

Last, the CPU 304 composes a query response based on the iSCSI name, the IP address and the TCP port number of the target in question, and sends the composed response to the host 4 through the management NIF 309 (S1312).

When the host 4 receives the query response, the CPU 404 executes the discovery program 422 to extract the iSCSI name, the IP address and the TCP port number of the target from the query response.

Next, the CPU 404 of the host 4 executes the iSCSI processing program 420 to perform login processing (S1313).

In this processing, the CPU 404 composes a login request based on the iSCSI name of the initiator operating on the host 4, the target's iSCSI name acquired in the discovery processing (S1309) and the iSCSI layer's authentication method that the initiator in question supports. Then, the CPU 404 sends the composed login request to the destination identified by the IP address and the TCP port number acquired in the discovery processing (S1309), through the NIF 408 (S1314).

In the present embodiment, it is assumed that the initiator operating on the host 4 supports NOAUTH as an authentication method, in addition to CHAP mentioned above. Here, NOAUTH means that authentication is not performed. Thus, the authentication method of the login request includes CHAP and NOAUTH.

When the storage device 1 receives the login request, then the CPU 104 executes the iSCSI name-based authorization program 122 to perform iSCSI name-based authorization processing (S1315).

In this processing, the CPU 104 extracts the iSCSI names of the initiator and the target from the login request, and searches the iSCSI name-based authorization table 131 for a record having the entries 1310 and 1311 whose contents coincide with those iSCSI names respectively.

When a record satisfying the conditions is found, the CPU 104 judges that the initiator in question can access the target in question as far as judging from the iSCSI names. And the CPU 104 extracts the authentication methods selectable in the present embodiment from the login request, and selects one of the methods. The CPU 104 composes a login response based on the selected authentication method, and sends the composed response to the host 4 through the NIF 108 (S1316).

The selection of the authentication method in the step S1316 is performed as follows.

As described above, in the present embodiment, the initiator operating on the host 4 supports CHAP and NOAUTH as an authentication method. Here, in the processing for the host 4 to log in the storage device 1, authentication has not been performed in the layers other than the iSCSI layer before S1316. Accordingly, the method in which authentication is performed, i.e., CHAP, is selected.

On the other hand, when a record satisfying the above-mentioned conditions is not found in S1315, then the CPU 104 judges that the initiator in question can not access the target in question, composes a login response reporting fail of the login, and sends the composed response to the host 4 through the NIF 108.

When the host 4 receives the login response, the CPU 404 executes the iSCSI processing program 420 to perform iSCSI authentication processing (S1317).

In this processing, the CPU 404 extracts the authentication method from the login response, and performs the processing according to the procedure of the authentication method. Here, the storage device 1 selected CHAP in S1316, and the processing according to the CHAP procedure will be described as an example.

First, the CPU 404 composes a login request based on names of hash algorithms supported by the iSCSI processing program 420, and sends the composed request to the storage device 1 through the NIF 408 (S1318). In the present embodiment, it is assumed that the iSCSI processing program 420 supports MD5 as a hash algorithm. Namely, the login request composed by the CPU 404 in S1318 includes MD5 as a hash algorithm name.

When the storage device 1 receives the login request, the CPU 104 executes the iSCSI authentication program 121 to perform algorithm decision processing (S1319). 205. In this processing, the CPU 104 extracts the names of the hash algorithms from the login request, and selects one hash algorithm supported by the iSCSI authentication program 121 out of the extracted names. Then the CPU 104 composes a login response based on the selected hash algorithm name, and sends the composed response to the host 4 through the NIF 108 (S1320). In the present embodiment, it is assumed that the iSCSI authentication program 121 supports MD5 as a hash algorithm. Accordingly, MD5 is selected in S1320.

When the host 4 receives the login response, the CPU 404 extracts the hash algorithm name from the login response. Then, using the algorithm (MD5 in the present embodiment) corresponding to the extracted hash algorithm name, the CPU 404 calculates a hash value of the authentication information acquired from the configuration storing area 430.

Then the CPU 404 composes a login request based on this hash value and the authentication name acquired from the configuration storing area 430, and sends the composed request to the storage device 1 through the NIF 408 (S1321).

When the storage device 1 receives the login request, the CPU 104 executes the iSCSI authentication program 121 to perform iSCSI authentication processing (S1322).

In this processing, the CPU 104 extracts the authentication name and the hash value of the authentication information from the login request. Then the CPU 104 searches the authentication table 130 for a record having the entry 1300 containing "iscsi-chap" and the entry 1301 whose content coincides with the authentication name extracted from the login request.

When a record satisfying the condition is found, the CPU 104 acquires the authentication information, i.e., the content of the entry 1302 of the record, and calculates the hash value of the authentication information using the hash algorithm selected in S1320.

When the calculated hash value coincides with the authentication information's hash value extracted from the login request, then it is judged that the authentication is successful, and the CPU 104 performs processing from S1323 onward. On the other hand, when a record satisfying the conditions is not found or the calculated hash value does not coincide with the authentication information's hash value extracted from the login request, then the CPU 104 judges that the authentication ends in failure, composes a login response to report the failure of the login, and sends the composed response through the NIF 108.

Next, in the case where the authentication processing of S1322 ends in success, the CPU 104 executes the authentication name-based authorization program 123 to perform authentication name-based authorization processing (S1323). Details of the authentication name-based authorization processing will be described later.

When, as a result of this processing, the login of the initiator in question is authorized, then the CPU 104 composes a login response to report the success of the login, and sends the composed response to the host 4 through the NIF 108 (S1324). On the other hand, when the login of the initiator in question is not authorized, the CPU 104 composes a login response to report the failure of the login, and sends the composed response to the host 4 through the NIF 108.

Figure 14:
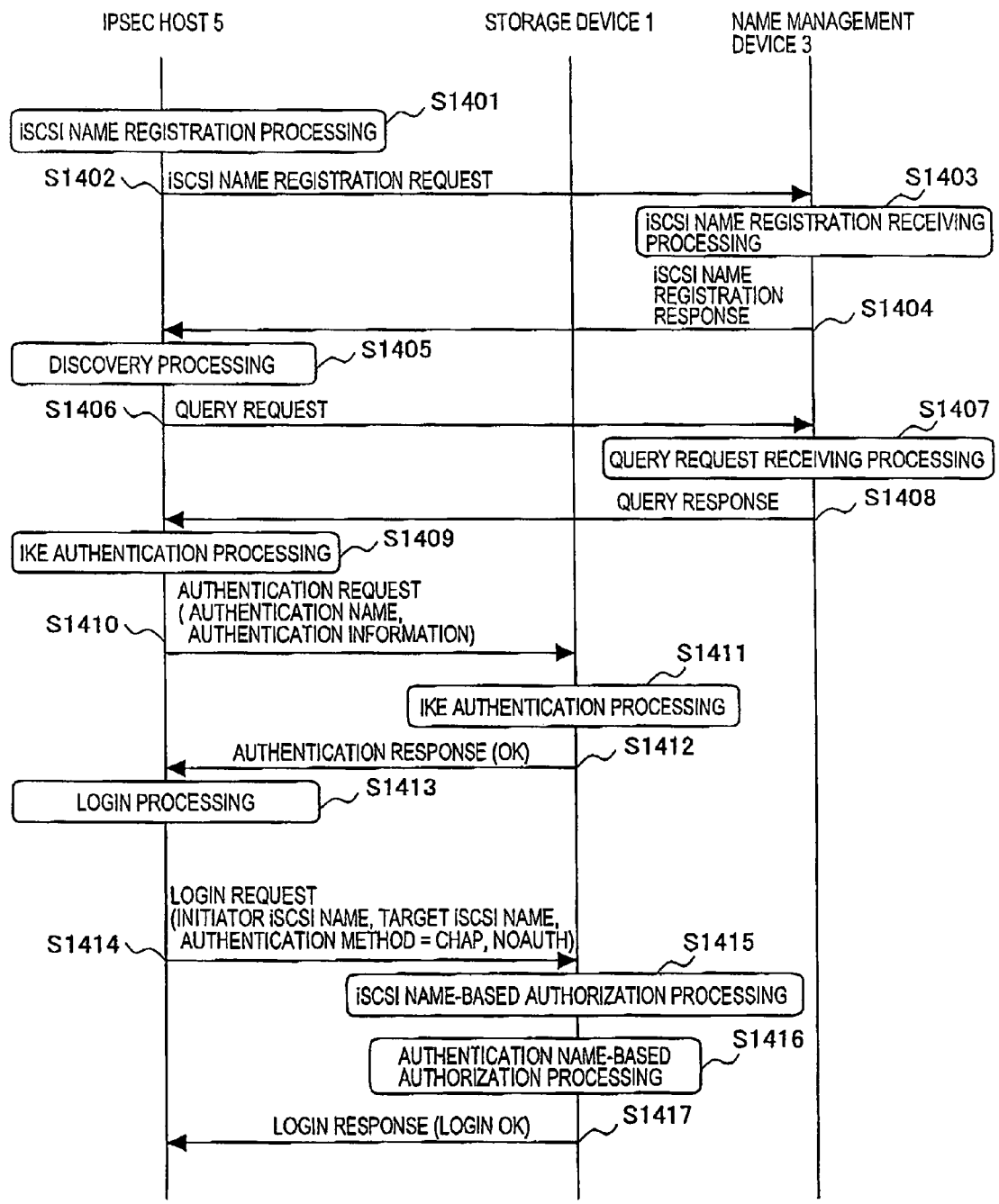
FIG. 14 is a diagram showing an example of a sequence of communication between devices at the time when the IPSec host 5 logs in the storage device 1.

FIG. 14 is a diagram showing an example of a sequence of communication between devices at the time when the IPSec host 5 logs in the storage device 1. The figure shows operation at the time when the IPSec host 5 performs authentication processing in the IPSec layer. When the authentication processing is performed in the iSCSI layer, operation is similar to FIG. 13. Namely, it is assumed that the iSCSI name registration processing of the storage device 1 and the iSCSI name registration receiving processing of the name management device 3 (i.e., the processing of S1301 through S1304 in FIG. 13) have been finished.

When, first according to an instruction of the system administrator or the like, the IPSec host 5 makes the iSCSI initiator start operating, then the CPU 504 of the IPSec host 5 performs iSCSI name registration processing and discovery processing, and the CPU 304 of the name management device 3 performs iSCSI name registration receiving processing and query request receiving processing (S1401 through S1408).

Operation of the IPSec host 5 and the name management device 3 in S1401 through S1408 is similar to S1305 through S1312 of FIG. 13 except that the host 4 is changed to the IPSec host 5, the CPU 404 to the CPU 504, the management NIF 409 to the management NIF 509, the iSCSI name registration program 421 to the iSCSI name registration program 521, the discovery program 422 to the discovery program 522, and the configuration storing area 430 to the configuration storing area 530.

Next, the CPU 504 of the IPSec host 5 executes the IPSec processing program 524 to perform processing of the IKE phase 1. In detail, after negotiation of an encryption algorithm used in an authentication method and a key exchange phase of the IPSec layer, IKE authentication processing is performed (S1409).

In the present embodiment, it is assumed that the IPSec processing program 524 of the IPSec host 5 and the IPSec processing device 105 of the storage device 1 support the pre-shared key system. Thus, the above-mentioned negotiation determines use of the pre-shared key system for an authentication method in the IPSec layer.

In the IKE authentication processing, the CPU 504 composes an authentication request based on the authentication name and the authentication information acquired from the configuration storing area 530, and sends the composed request to the storage device 1 through the NIF 508 (S1410).

When the storage device 1 receives the authentication request, then the IPSec processing device 105 performs IKE authentication processing (S1411).

In this processing, the IPSec processing device 105 extracts the authentication name and the authentication information from the authentication request, searches the authentication table 130, and judges whether a combination of the authentication name and the authentication information is valid, based on existence of a record coincident with that combination.

When there exists a record coincident with the above-mentioned combination, then the IPSec processing device 105 composes an authentication response indicating success of the authentication, and sends the composed response to the IPSec host 5 through the NIF 108 (S1412). When the IPSec host 5 receives the authentication response, the CPU 504 executes the IPSec processing program 524 to perform processing of the IKE phase 2. Thereafter, communication between the IPSec host 5 and the storage device 1 is performed in cipher.

When there does not exist a record coincident with the combination of the authentication name and the authentication information in S1411, the IPSec processing device 105 composes an authentication response indicating failure of the authentication, and sends the composed response to the IPSec host 5 through the NIF 108.

When the authentication is successful in S1412, then the IPSec host 5 performs login processing and the storage device 1 performs iSCSI name-based authentication processing (S1413 through S1415).

Operation of the IPSec host 5 and the storage device 1 in S1413 through S1415 is similar to S1313 through S1315 of FIG. 13 except that the host 4 is changed to the IPSec host 5, the CPU 404 to the CPU 504, the management NIF 409 to the management NIF 509, and the iSCSI processing program 420 to the iSCSI processing program 520.

When it is judged, as a result of the iSCSI name-based authorization processing, that the initiator in question can access the target in question as far as judging from the iSCSI names, then the authentication methods are extracted from the login request sent by the IPSec host 5 in S1413, and one is selected out of those authentication methods.

In the case of the login from the IP Sec host 5, the authentication has been finished in S1409 through S1412. Thus, it is judged that authentication in the iSCSI layer is not required, and here, NOAUTH is selected as the authentication method.

Then the CPU 104 executes the authentication name-based authorization program 123 to perform authentication name-based authorization processing (S1416). Details of this authentication name-based authorization processing will be described later.

When, as a result of this processing, the login of the initiator in question is authorized, the CPU 104 composes a login response to report the success of the login, and sends the composed response to the IPSec host 5 through the NIF 108 (S1417). On the other hand, when the login of the initiator in question is not authorized, the CPU 104 composes a login response to report failure of the login, and sends the composed response to the IPSec host 5 through the NIF 108.

Figure 15:
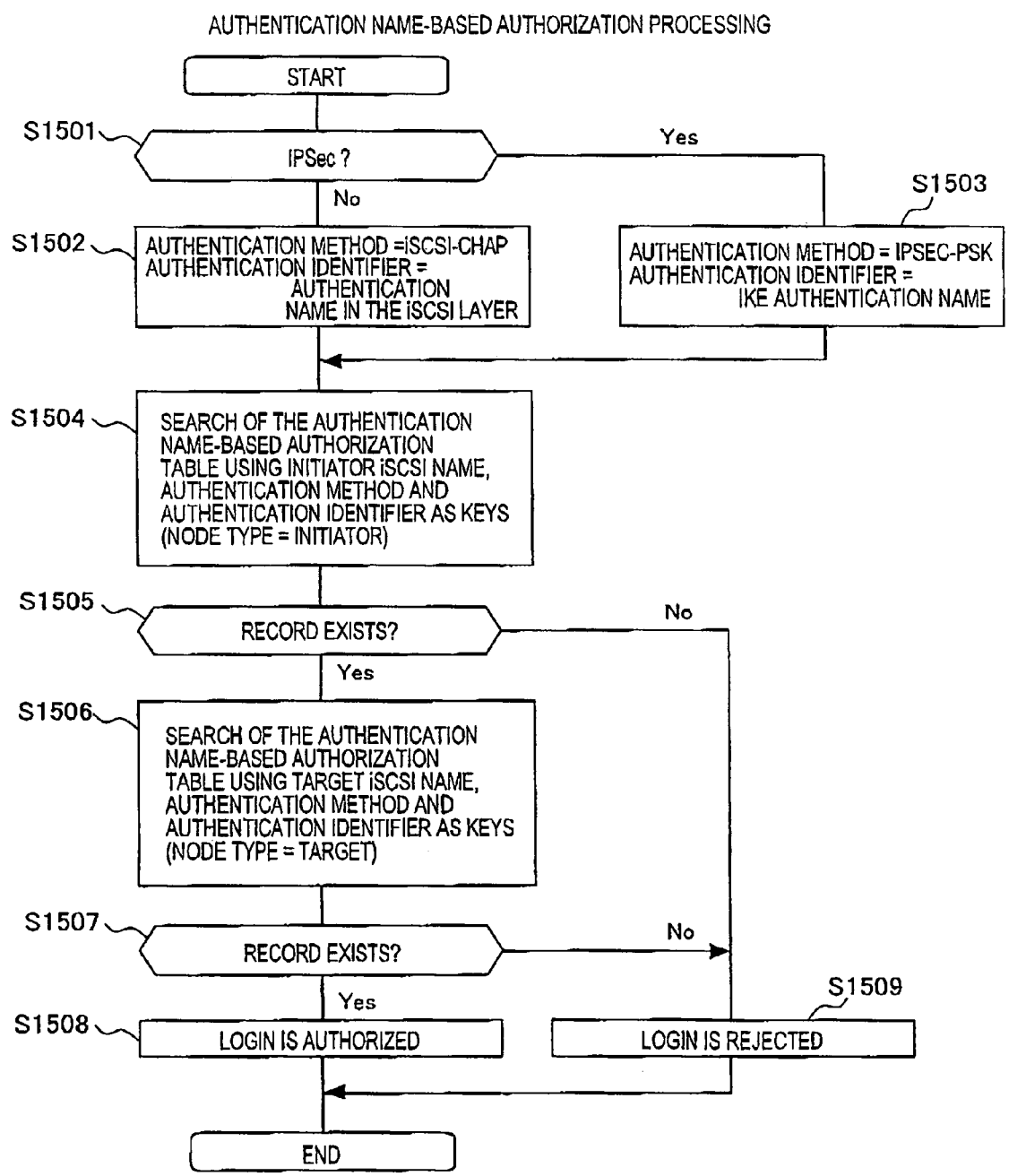
FIG. 15 is a flowchart showing an operating procedure of authentication name-based authorization processing.

FIG. 15 is a flowchart showing an operating procedure of the authentication name-based authorization processing performed in S1323 of FIG. 13 and S1416 of FIG. 14. 231. First, the CPU 104 of the storage device 1 branches the processing depending on existence or nonexistence of authentication in the IPSec layer (S1501).

In the case where authentication is not performed in the IPSec layer, the CPU 104 sets the authentication method to "iscsi-chap" and an authentication identifier to the authentication name extracted from the login request in S1320 of FIG. 13 (S1502). On the other hand, in the case where authentication has been performed in the IPSec layer, the CPU 104 sets the authentication method to "ipsec-psk" and the authentication identifier to the authentication name that is received at the time of the IKE authentication processing and acquired from the IPSec processing device 105 (S1503).

Here, the authentication in the IPSec layer is performed only when the login request is issued from the IPSec host 5.

Next, the CPU 104 searches the authentication name-based authorization table 132 for a record having the entries 1320, 1321, 1322 and 1323 whose contents coincide with the authentication method, the authentication identifier, "initiator" and the initiator's iSCSI name extracted from the login request in S1315 respectively ((S1504), and branches the processing according to the search results (S1505).

When a record satisfying the conditions is not found, the CPU 104 rejects the login and ends the processing (S1509).

On the other hand, when a record satisfying the conditions is found, the CPU 104 searches the authentication name-based authorization table 132 for a record having the entries 1320, 1321, 1322 and 1323 whose contents coincide with the authentication method, the authentication identifier, "target" and the target's iSCSI name extracted from the login request in S1315 respectively (S1506), and branches the processing according to the search results (S1507).

When a record satisfying the conditions is not found, the CPU 104 rejects the login and ends the processing (S1509).

When, in the above-described authentication name-based authorization processing, the authentication name-based authorization table 132 does not have the entry 1322, or in other words, when access control is performed using only a combination of a target's iSCSI name, an authentication name and an authentication type, or only a combination of an initiator's iSCSI name, an authentication name and an authentication type, then the processing of S1504 and S1505 or S1506 and S1507 is not necessary.

The present embodiment assumes that the name management device 3 is connected to the IP-SAN 8. However, the present invention can be applied to the case where the name management device 3 does not exist. In that case, the domain registration processing and the domain set registration processing of S1007 through S1015 of FIG. 10 and the iSCSI name registration processing and the discovery processing of S1401 through S1408 of FIG. 14 are not necessary.

In that case, each of the host 4 and the IPSec host 5 is previously set with the iSCSI name, the IP address and the port number of the target that the initiator logs in, or the IP address and the port number of the target that the initiator logs in. Or, the initiator establishes an iSCSI discovery session with the target, to acquire the iSCSI name of the target.

In the case where the name management device 3 does not exist, the buttons 918 and 919 can not be selected in the authentication name-based authorization information registration screen of FIG. 9B.

Further, in the present embodiment, targets that an initiator can log in are limited based on a user of the host 4 or the IPSec host 5, while discovery is not limited based on a user. The name management device 3 may limit targets that can be discovered based on a user of the host 4 or the IPSec host 5.

In the case where the name management device 3 is concerned with the limitation, the magnetic disk 303 of the name management device 3 holds an authentication table having entries for respectively registering an authentication type, an authentication name and authentication information of a user and an authorization table having entries for respectively registering an authentication type, an authentication name of a user and a node type and an iSCSI name of an iSCSI node.

On the other hand, after the processing of S1105 of FIG. 11, the storage management device 2 sends an authentication information registration request to the name management device 3. Then, the name management device 3 adds a record to the authentication table, and thereafter sends an authentication information registration response to the storage management device 2.

Further, after the processing of S1115 of FIG. 11, the storage management device 2 sends an authentication name-based authorization information registration request to the name management device 3. Then the name management device 3 adds a record to the authorization table, and thereafter sends an authentication name-based authorization information registration response to the storage management device 2.

Further, in the processing of S1309 of FIG. 13, the host 4 first sends an authentication request including an authentication name and authentication information to the name management device 3. And the name management device 3 performs authentication based on the authentication name and the authentication information extracted from the authentication request, and sends an authentication response to the host 4.

When the host 4 receives the authentication response, then the host 4 sends a query request to the name management device 3. Receiving the query request, the name management device 3 uses the authentication name (which is extracted from the authentication request) as a key to search the authorization table.

In the case where the node type of a record retrieved by the search is "initiator", the name management device 3 examines whether the iSCSI name in the record coincides with the initiator's iSCSI name extracted from the query request. In the case where the iSCSI names do not coincide with each other, the name management device 3 sends a query response indicating an error to the host 4.

In the case where the iSCSI names coincide, the name management device 3 performs First Search and Second Search of the query request receiving processing (S1311).

In the case where the node type of a record retrieved by the search of the authorization table is "target", the name management device 3 examines whether the iSCSI name in the record and the target's iSCSI name acquired by Second Search of S1311 coincide with each other, and removes a non-coincident iSCSI name.

When all the iSCSI names are non-coincident, then the name management device 3 sends a query response indicating an error to the host 4. On the other hand, when there exists a coincident iSCSI name, the name management device 3 performs Third Search of S1311, and last composes a query response to send the composed response to the host 4.

According to the above-described processing, the name management device 3 can limit targets that can be logged in and limit targets that can be discovered, based on an authentication name of a user.

Hereinabove, the first embodiment has been described. According to the first embodiment, invalid access from a valid computer can be prevented by performing the authentication processing based on iSCSI names in association with the authentication processing based on an authentication name. In other words, it is possible to prevent impersonation by an inside criminal or a cracker who changes an iSCSI name of an initiator.

Further, the present embodiment provides the mechanisms using discovery domains and discovery domain sets for designating initiators and targets that can be used by a certain user, and thus, load of setting work required for authentication processing can be reduced.

Next, a second embodiment according to the present invention will be described. Here, only different points from the first embodiment will be described.

In the first embodiment, the storage device 1 searches the iSCSI name-based authorization table 131 once in the iSCSI name-based authorization processing S1315 shown in FIG. 13, and searches the authentication name-based authorization table 132 twice in the authentication name-based authorization processing S1322.

On the other hand, in the second embodiment, the iSCSI name-based authorization table 131 and the authentication name-based authorization table 132 are combined into one table so that acceptance or rejection of login can be judged by one table search. As a result, time required for authentication processing can be reduced.

In the present embodiment, the magnetic disk 103 of the storage device 1 stores an authorization table 134 instead of the iSCSI name-base authorization table 132 and the authentication name-based authorization table 133.

The other features of the configuration are similar to the first embodiment, and will not be described here. Further, the programs stored in the main memories of the host 4, the IPSec host 5, the name management device 3, the storage management device 2 and the storage device 1 will be described in the following with respect to only their different points from the first embodiment.

FIG. 16 is a diagram showing an example of the data structure of the authorization table 134. The authorization table 134 has the array structure and can store one or more records. Each record of the authorization table 134 includes an entry 1340 which stores an authentication type, an entry 1341 which stores an authentication name, an entry 1342 which stores an iSCSI name of an initiator, and an entry 1343 which stores an iSCSI name of a target.

Here, the entry 1343 stores an iSCSI name of a target (i.e., a storing area) that the user having the authentication name stored in the entry 1341 is permitted to access, and the entry 1342 stores an iSCSI name of an initiator (i.e., a computer) that can access that target.

It is possible to arrange the authentication table 134 such that the entry 1342 stores an iSCSI name of an initiator (i.e., a computer) that the user having the authentication name stored in the entry 1341 is permitted to use, and the entry 1343 stores an iSCSI name of a target (i.e., a storing area) that the initiator in question can access.

Next, a GUI used in the second embodiment will be described.

FIG. 17 is a diagram showing an example of display of an authorization information registration screen 1700 for receiving registration of information required for the authorization processing from the system administrator or the like.

The authorization information registration screen 1700 is provided with an area 1701 for receiving an instruction to select information on a user, an area 1702 for receiving an instruction to select iSCSI nodes that the user selected in the area 1701 can use, a button 1718 for receiving an instruction to register the information specified in those areas, and a button 1719 for receiving an instruction to cancel the registration.

Further, the area 1701 is provided with a button 1704 for receiving selection of an authentication method, an area 1703 for displaying the authentication method selected by the button 1704, a button 1706 for receiving selection of an authentication name out of authentication names registered using the authentication information registration screen 820, and an area 1705 for displaying the authentication name selected by the button 1706.

Further, the area 1702 is provided with buttons 1707, 1708 and 1709 for receiving selection of a method of designating iSCSI nodes, Here, selection of the button 1707 means reception of designation of iSCSI nodes by means of iSCSI names, the button 1708 by means of a discovery domain name, and the button 1709 by means of a discovery domain set name. Only one of the buttons 1707, 1708 and 1709 can be selected.

Further, the area 1702 is provided with a button 1711 for receiving selection of an iSCSI name of an initiator when the button 1707 is selected, an area 1710 for displaying the iSCSI name selected by the button 1711, a button 1713 for receiving selection of an iSCSI name of a target when the button 1707 is selected, an area 1712 for displaying the iSCSI name selected by the button 1713, a button 1715 for receiving selection of a discovery domain name when the button 1708 is selected, an area 1714 for displaying the discovery domain name selected by the button 1715, a button 1717 for receiving selection of a discovery domain set name when the button 1709 is selected, and an area 1716 for displaying the discovery domain set name selected by the button 1717.

Next, communication sequences between various devices and flowcharts showing operation of the devices will be described.

First, referring to FIG. 11 used for explaining the first embodiment, a communication sequence in the second embodiment in the case where the storage management device 2 registers authentication information and authorization information according to an instruction from the system administrator or the like will be described.

The authentication information registration processing of S1101 through S1105 is similar to the first embodiment. Further, the iSCSI name-based authorization information registration processing of S1106 through S1110 is not necessary in the present embodiment.

Next, in S1111, the CPU 204 of the storage management device 2 executes the GUI control program 220 to perform authorization information registration screen display processing for displaying the authorization information registration screen 1700 on the display 205.

Thereafter, when a push of the button 1718 is received from the system administrator or the like in the authorization information registration screen 1700, then the CPU 204 of the storage management device 2 executes the authorization information registration program 225 to perform authorization information registration processing (S1112). Details of the authorization information registration processing will be described later.

Based on an iSCSI node pair list acquired as a result of this processing, the authentication method selected by the button 1704 and the authentication name selected by the button 1706, the CPU 204 composes an authorization information registration request, and sends the composed request to the storage device 1 through the management NIF 209 (S1113).

Here, the iSCSI node pair list means a list of pairs each of which consists of an iSCSI name of an iSCSI initiator and an iSCSI name of an iSCSI target that the user of the authentication name designated in S1706 can use.

When the storage device 1 receives the authorization registration request, then the CPU 104 executes the authorization information registration receiving program 125 to perform authorization information registration processing (S1114).

In this processing, first the CPU 104 extracts the iSCSI node pair list, the authentication method and the authentication name from the authorization information registration request. Next, for each iSCSI name included in the iSCSI node pair list, the CPU 104 adds a record to the authorization table 134.

Here, the authentication method is registered in the entry 1340 of an added record, the authentication name the entry 1341, the initiator's iSCSI name the entry 1342, and the target's iSCSI name the entry 1343. Then the CPU 104 sends an authorization information registration response to the storage management device 2 through the management NIF 109, to report success of the registration of the authorization information (S1115).

Figure 18:
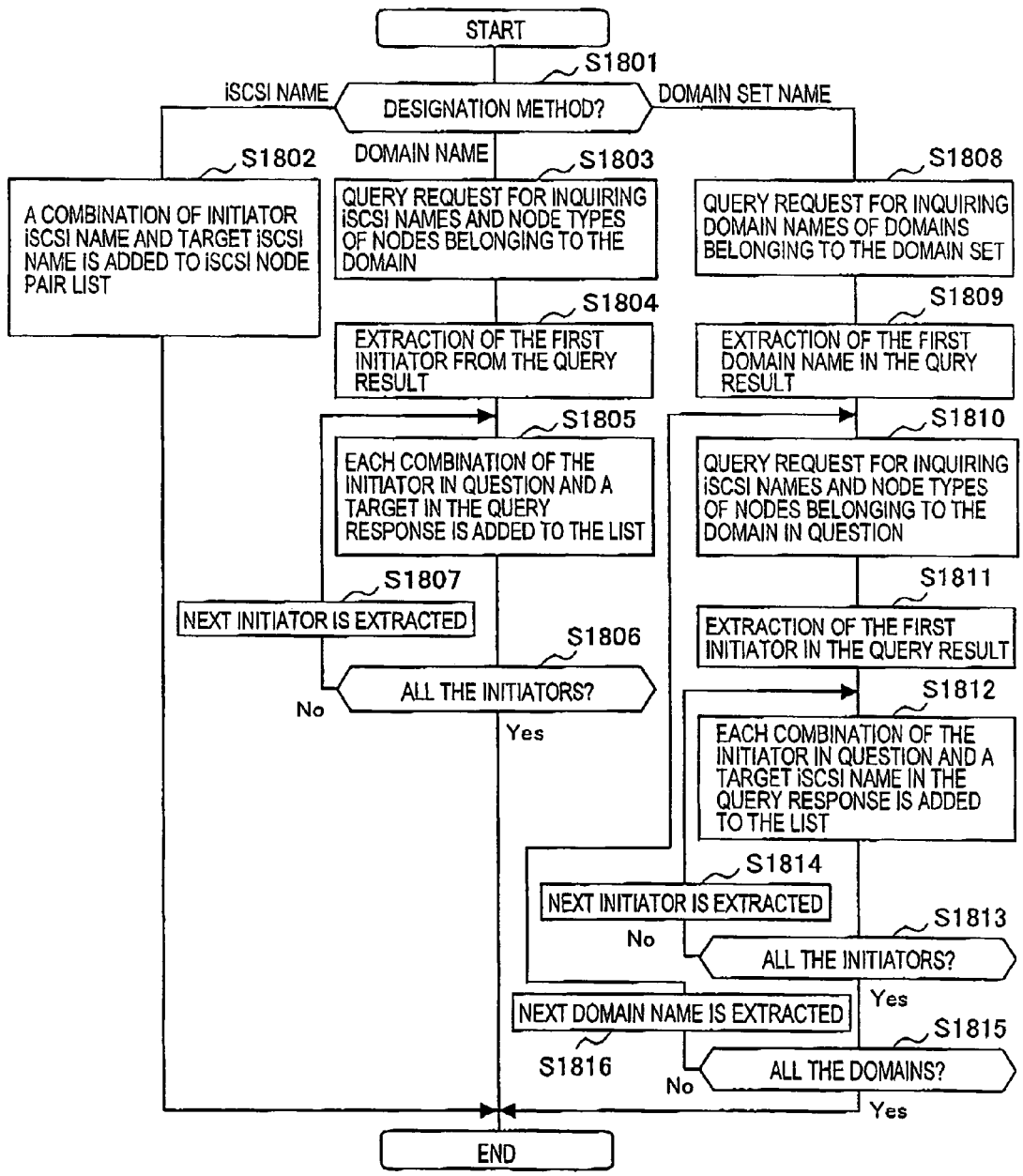
FIG. 18 is a flowchart showing an operating procedure of the above-mentioned authorization information registration processing.

FIG. 18 is a flowchart showing an operating procedure of the authorization information registration processing.

In the beginning, the CPU 204 branches the processing according to the iSCSI node designation method selected by the system administrator or the like through the authorization information registration screen 1700 (S1801).

First, processing performed in the case where selection of the button 1707 is received (i.e., designation by an iSCSI name is selected) will be described.

The CPU 204 adds a combination of the initiator's iSCSI name selected by the button 1711 and the target's iSCSI name selected by the button 1713 to the iSCSI node pair list, and ends the processing (S1802).

Secondly, processing performed in the case where selection of the button 1708 is received (i.e., designation by a discovery domain name is selected) will be described.

The CPU 204 composes a query request for inquiring iSCSI names and node types of iSCSI nodes belonging to the discovery domain selected by the button 1715, and sends the composed request to the name management device 3 through the management NIF 209 (S1803). Next, receiving a query response from the name management device 3, the CPU 204 extracts an iSCSI name of the first initiator from the query response (S1804). Then, a combination of the iSCSI name of the initiator in question and an iSCSI name of each target included in the query response is added to the iSCSI node pair list (S1805).

The CPU 204 judges whether the processing of S1805 has been executed for all the initiators included in the query response received in S1804 (S1806). When all the initiators have been dealt with, then the processing is ended.

On the other hand, when an initiator still to be dealt with is found in the step S1806, the next initiator's name included in the query response received in S1804 is extracted (S1807), to repeat the processing of S1805 and S1806.

Thirdly, processing performed in the case where selection of the button 1709 is received (i.e., designation by a discovery domain set name is selected) will be described.

The CPU 204 composes a query request for inquiring names of discovery domains that belong to the discovery domain set selected by the button 1717, and sends the composed request to the name management device 3 through the management NIF 209 (S1808). Next, receiving a query response from the name management device 3, the CPU 204 extracts the first discovery domain name from the query response (S1809).

Then the CPU 204 composes a query request for inquiring iSCSI names and node types of iSCSI nodes that belongs to the discovery domain in question, and sends the composed request to the name management device 3 through the management NIF 209 (S1810). Next, receiving a query response from the name management device 3, the CPU 204 extracts an iSCSI name of the first initiator from the query response (S1811). Then, a combination of the iSCSI name of the initiator in question and an iSCSI name of each target included in the query response is added to the iSCSI node pair list (S1812).

The CPU 204 judges whether the processing of S1812 has been executed for all the initiators included in the query response received in S1811 (S1813). When all the initiators have been dealt with, the processing is ended.

On the other hand, when an initiator still to be dealt with is found in the step S1813, then the next initiator's name included in the query response received in S1811 is extracted (S1814) to repeat the processing of S1812 and S1813.

Next, the CPU 204 judges whether the processing of S1810 through S1814 has been executed for all the discovery domain names included in the query response received in S1809 (S1815). When it is judged that all the discovery domain names have been dealt with, then the processing is ended.

On the other hand, when it is judged in the step S1815 that there exists a discovery domain name still to be dealt with, then the next discovery domain name included in the query response received in S1809 is extracted (S1816) to repeat the processing of S1810 through S1815.

Next, referring to FIG. 13, a communication sequence at the time when the host 4 logs in the storage device 1 in the present embodiment will be described.

In the present embodiment, the processing of S1301 through S1314 is similar to the first embodiment. Further, the processing of S1315 is not necessary. Further, the processing of S1316 through S1321 is similar to the first embodiment.

In S1322 in the present embodiment, instead of the iSCSI authentication program 121, the CPU 104 executes an authorization program (not shown), which is loaded onto the main memory of the storage device 1 to be executed, to perform authorization processing. Details of the authorization program will be described later. The processing of S1323 is similar to the first embodiment.

Next, referring to FIG. 14, will be described a communication sequence at the time when the IPSec host 5 logs in the storage device 1 in the second embodiment.

In the present embodiment, the processing of S1401 through S1414 is similar to the first embodiment. The processing of S1415 is not necessary in the present embodiment. In S1416 in the present embodiment, the CPU 104 executes the above-mentioned authorization program instead of the authentication name-based authorization program 123, to perform authorization processing. Details of the authorization processing will be described later. Further, the processing of S1417 is similar to the first embodiment.

Next, referring to FIG. 15 used for explaining the operating procedure of the authentication name-based authorization processing in the first embodiment, an operating procedure of authorization processing performed by the above-mentioned authorization program will be described.

Also in the present embodiment, the processing of S1501 through S1503 is similar to the authentication name-based authorization processing of the first embodiment.

Next, the CPU 104 searches the authorization table 134 for a record having the entries 1340, 1341, 1342 and 1343 whose contents coincide respectively with the authentication method, the authentication identifier, and the initiator's iSCSI name and the target's iSCSI name extracted from the received login request (S1504), and branches the processing according to a search result (S1505).

In the present embodiment, the processing of S1506 and S1507 is not necessary.

When a record satisfying the conditions is not found in S1505, the CPU 104 rejects the login and ends the processing (S1509).

On the other hand, when a record satisfying the conditions is found, the CPU 104 accepts the login and ends the processing (S1508).

Hereinabove, the second embodiment has been described. According to the second embodiment, it is possible to prevent invalid access from a valid computer, similarly to the first embodiment. Further, the tables which store information required for the authorization processing are combined into one table. Accordingly, the number of table searched for authorization and authentication can be decreased in comparison with the first embodiment. Thus, time required for the authorization processing can be reduced.

Next, a third embodiment will be described. Here, only different points from the first embodiment will be described.

In the first embodiment, the authentication table 130 is stored on the magnetic disk 103 of the storage device 1. In such arrangement, load of setting by the system administrator or the like becomes higher in the case where a computer system is provided with a plurality of storage devices 1, since the system administrator or the like should register an authentication name and authentication information of a same user to each storage device 1.

The present embodiment has an authentication device 6 that manages, in a centralized manner, an authentication table 130 for all the storage devices 1 provided in a computer system. According to such arrangement, the present embodiment can reduce work load of registering an authentication name and authentication information.

For example, as a representative authentication device 6, a RADIUS (Remote Authentication Dial In User Service) server may be mentioned.

In the present embodiment, the authentication device 6 is connected to the management network 9 through the communication line 11.

FIG. 19 is a diagram for explaining a configuration of the authentication device 6. The authentication device 6 comprises a main memory 601, a communication line 602 such as a bus, a magnetic disk 603, a CPU 604, a display 605, a pointing device 606, a character input device 607, an NIP 608 and a management NIF 609.

The main memory 601 stores an authentication information registration receiving program 620 and an authentication program 621. Operation of the authentication information registration receiving program 620 is similar to the authentication information registration receiving program 124.

The magnetic disk 603 stores an authentication table 630. FIG. 20 shows an example of the data structure of the authentication table 630.

As shown in the figure, each record of the authentication table 630 includes an entry 6300 for registering an authentication type, an entry 6301 for registering an authentication name, and an entry 6302 for registering authentication information corresponding to that authentication name.

The present embodiment does not require the authentication information registration receiving program 124 and the authentication table 130 provided to the storage device 1 in the first and second embodiments.

Next, referring to FIG. 11 used for explaining the first embodiment, an example of a sequence of communication between devices in the present embodiment at the time when the storage management device 2 registers authentication information, iSCSI name-based authorization information and authentication name-based authorization information according to an instruction from the system administrator or the like will be described.

The processing of S1101 and S1102 is similar to the first embodiment. Next, the processing of S1103 through S1105 is similar to the first embodiment except that the storage device 1 is changed to the authentication device 6, the authentication information registration receiving program 124 to the authentication information registration receiving program 620, and the CPU 104 to the CPU 604. And the processing of S1106 through S1115 is similar to the first embodiment.

Next, referring to FIG. 13 used for explaining the first embodiment, an example of a sequence of communication between the devices in the present embodiment at the time when the host 4 logs in the storage device 1 will be described.

In the present embodiment, the processing of S1301 through S1318 is similar to the first embodiment. 321. Next, when the storage device 1 receives an login request in S1319, then, in the present embodiment, the CPU 104 transfers the received login request to the authentication device 6.

When the authentication device 6 receives the transferred login request, the CPU 604 of the authentication device 6 executes the authentication program 621 to perform authentication processing.

In this processing, the CPU 604 extracts hash algorithm names from the login request, and selects one hash algorithm supported by the authentication program 621 out of the extracted hash algorithm names. Then, using the selected algorithm name, the CPU 604 composes a login response, and sends the composed response to the storage device 1 through the NIF 609.

When the storage device 1 receives the login response, the CPU 104 transfers the received login response to the host 4 through the NIF 108 (S1320). The present embodiment assumes that MD5 is selected as the hash algorithm.

Next, when the host 4 receives the login response, then the CPU 404 extracts the hash algorithm name from the login response. Then the CPU 404 uses the algorithm (MD5 in the present embodiment) corresponding to the extracted hash algorithm name to calculate a hash value of the authentication information acquired from the configuration storing area 430.

Then the CPU 404 composes a login request based on the calculated hash value and the authentication name acquired from the configuration storing area 430, and sends the composed request to the storage device 1 through the NIF 408 (S1321).

When the storage device 1 receives the login request, the CPU 104 transfers the login request to the authentication device 6.

When the authentication device 6 receives the transferred login request, the CPU 604 extracts the authentication name and the hash value of the authentication information from the login request. Next, the CPU 604 searches the authentication table 630 for a record having the entry 6300 whose content is "iscsi-chap" and the entry 6301 whose content coincides with the authentication name extracted from the login request.

When a record satisfying the conditions is found, the CPU 604 extracts the authentication information, i.e., the content of the entry 6302 of that record, and calculates a hash value of the extracted authentication information using the hash algorithm selected in S1320.

When this hash value coincides with the authentication information hash value extracted from the login request, then the CPU 604 judges that the authentication is successful. Then the CPU 604 composes a login response indicating success of the login and sends the composed response to the storage device 1 through the NIF 609.

On the other hand, when a record satisfying the condition is not found or when the calculated hash value does not coincide with the authentication information hash value extracted from the login request, then the CPU 604 judges that the authentication ends in failure. Then the CPU 604 composes a login response indicating failure of the login and sends the composed response to the storage device 1 through the NIF 609.

When the storage device 1 receives the login response that indicates the success of the login, then the CPU 104 performs authentication name-based authorization processing. On the other hand, when the login response indicating the failure is received, the CPU 104 transfers the login response to the host 4 through the NIF 108.

Hereinabove, the third embodiment has been described. Similarly to the first and second embodiments, the third embodiment can prevent invalid access from a valid computer. Further, since the authentication device 6 manages the authentication table 130 in a centralized manner, it is possible to reduce work load for registering an authentication name and authentication information.

The first, second and third embodiments have been described taking examples where an initiator operates in the host 4 or the IPSec host 5. However, the present invention is not limited to this.

For example, the present invention can be applied also to the case where an initiator operates in the storage device 1. Namely, the present invention is effective for authentication and authorization in the case where the storage device 1 performs remote copy using iSCSI through WAN (Wide Area Network).

Further, the first, second and third embodiments have been described taking examples where a name of a user is used as an authentication name of the iSCSI authentication and the IKE authentication. However, the present invention is not limited to such arrangement. For example, in the case where a server device such as a DB server or a mail server communicates with a storage device 1 by iSCSI, a name of a server or a name of a business department may be used as an authentication name.

Further, the above embodiments have been described taking examples where tables are used. However, a form of holding information is not limited to this.

According to these embodiments, it is possible to improve security in a system in which a computer accesses a storage device 1 connected through a network.

What we claim is:

1. A storage system having a plurality of storing areas that can be accessed from a plurality of computers connected to the storage system through a network, comprising:
   a control unit; and
   a plurality of disk devices that constitute said plurality of storing areas and are connected to said control unit,
   wherein said control unit comprises:
   a first interface connected to said network,
   a memory, and a second interface connected to said plurality of disk devices, wherein said memory stores an authorization table which stores a combination of a computer identifier that identifies a computer among said plurality of computers and a storing area identifier that specifies a storing area accessible from the computer identified by said computer identifier, an authentication table which stores a combination of a user identifier that identifies a user who uses one of said plurality of computers and authentication information that authenticates said user, and an authentication name authorization table which stores a combination of an user identifier and a storing area identifier of a storing area that an user identified by said user identifier is permitted to access, and wherein said control unit uses said authorization table to authorize a computer that accesses a storing area, uses said authentication table to authenticate a user who accesses said storage system, uses said authentication name authorization table to judge whether the authenticated user who accesses a storing area from the authorized computer has a valid access right to said storing area, and permits access by said user only when said user has a valid access right.

2. A storage system according to claim 1, wherein when said control unit authorizes said computer, said control unit receives a login request through said first interface, said login request having been sent by said computer at a time when said computer accesses a storing area, extracts a combination of a computer identifier of the computer that has sent said login request and a storing area identifier of said storing area to which said computer requests access, from said login request, compares the extracted combination with combinations stored in said authorization table, and authorizes said computer that has sent said login request, when said authorization table stores a combination that matches said extracted combination;

wherein when said control unit authenticates said user, said control unit receives an authentication request sent from said computer, through said first interface; extracts a combination of a user identifier and authentication information from said authentication request, compares the extracted combination with combinations stored in said authentication table, and authenticates said user when said authentication table stores a combination that matches the extracted combination; and wherein when combination of the storing area identifier extracted from said login request and the user identifier extracted from said authentication request is a combination stored in said authentication name authorization table, then said control unit judges that said user has a valid access right.

3. A storage system according to claim 1, wherein said memory stores a second authentication name authorization table instead of said authentication name authorization table, said second authentication name authorization table storing a combination of a user identifier and a storing area identifier of a storing area that a user identified by said user identifier can access and a combination of said user identifier and a computer identifier which identifies a computer that said user identified by said user identifier is permitted to use, and wherein said control unit uses said second authentication name authorization table to judge whether said authenticated user accessing from said authorized computer is a valid user of said computer and has a valid access right to said storing area, and permits the access of said user only when said user is the valid user and has a valid access right.

4. A storage system according to claim 1, wherein said computer identifier and said storing area identifier are Internet Small Computer System Interview (iSCSI) names.

5. A computer system comprising:
a computer on which an initiator operates;
a storage system on which targets operate; and
a network connecting said computer and said storage system with each other, wherein; according to an instruction of a user, said computer sends said storage system a login request that includes an identifier of said initiator and an identifier of a target and an authentication request that includes an identifier which identifies said user and authentication information, wherein said storage system has an authorization table which stores a combination of an identifier of said initiator and an identifier of a target that said initiator is permitted to log into among said targets an authentication table which stores a combination of an identifier of a user of said computer and authentication information that authenticates said user, and an authentication name authorization table which stores a combination of the identifier of said user and an identifier of a target that said user is permitted to access among said targets, and wherein said storage system uses said authorization table to authorize said initiator which is the source of said login request, uses said authentication table to authenticate the user who has sent said authentication request, and uses said authentication name authorization table to judge whether said authenticated user who has logged in from the authorized initiator has a valid access right to said target and permits the login only when the user has the valid access right.

6. A computer system according to claim 5, wherein said storage system further has a second authentication name authorization table which stores a combination of an identifier of said user and an identifier of an initiator that said user is permitted to use among initiators, and wherein to judge existence of an access right to said target, said storage system uses said second authentication name authorization table to judge whether the authenticated user who has accessed said storage system from the authorized initiator is a valid user who is permitted to use said initiator and judges existence of said access right to said target only when the user is the valid user.

7. A computer system according to claim 5, wherein said computer system further comprises a storage management device connected to said network, wherein said storage management device has an input device which receives input of information to said authorization table, said authentication table and said authentication name authorization table, and wherein said storage management device sends information input through said input device, to said storage system through said network.

8. A computer system according to claim 7, wherein said storage management device acquires the identifiers of said initiator and said target respectively operating on said computer and said storage system connected to said network, and wherein said storage management device is provided with an interface which presents the acquired identifiers in a format in which a user can select the identifiers.

9. A computer system according to claim 8, wherein said computer system further comprises a name management device connected to said network,
wherein said name management device has a domain table which manages the identifier of said initiator in association with the identifiers of the targets that said initiator is permitted to access,
wherein when said name management device receives a discovery request including the identifier of said initiator from said initiator, said name management device returns the identifiers of the target that said initiator is permitted to access, to the initiator which is the source of the request, and
wherein before sending said login request, said computer sends said discovery request including the identifier of said initiator to said name management device to acquire the identifiers of the targets that said initiator is permitted to access.

10. A storage system according to claim 1, wherein said memory stores a third authentication name authorization table which stores a combination of said user identifier and said computer identifier of the computer that the user identified by said user identifier is permitted to use, instead of said authentication name authorization table, and
wherein said control unit uses said third authentication name authorization table to judge whether said authenticated user who accesses said authorized computer is a valid user of said computer and whether said user has a valid access right to said storing area, and permits the access only when said user is the valid user and has the valid access right.

11. A storage system according to claim 1, wherein said memory stores a second authorization table which stores a combination of the identifier of said user, said storing area identifier of the storing area that said user can access and said computer identifier of said computer that can access said storing area, instead of said authentication name authorization table and said authorization table, and
wherein said control unit uses said second authorization table to judge whether said authenticated user who accesses from said authorized computer is a valid user of said computer and has a valid access right to said storing area, and permits the access only when said user is the valid user and has the valid access right.

12. A storage system according to claim 1, wherein said memory stores a third authorization table which stores a combination of the identifier of said user, the computer identifier of the computer that said user is permitted to use and the storing area identifier of the storing area that said computer can access, instead of said authentication name authorization table, and
wherein said control unit uses said third authorization table to judge whether said authenticated user who accesses from said authorized computer is a valid user of said computer and has a valid access right to said storing area, and permits the access only when said user is the valid user and has the valid access right.

13. A computer system according to claim 8, wherein said computer system further comprises a second storage system connected to said network,
wherein said first storage system operates as an initiator,
wherein said second storage system receives access from the first storage system and has a plurality of storing areas,
wherein said second storage system has an authorization table which stores a combination of a storage system identifier which identifies said first storage system and a storing area identifier which identifies a storing area that said first storage system is permitted to access, an authentication table which stores a combination of a user identifier which identifies a user of said first storage system and authentication information which authenticates said user, and an authentication name authorization table which stores a combination of the identifier of said user and the storing area identifier of the storing area that said user can access,
wherein said second storage system uses said authorization table to authorize said first storage system accessing said storing area, said authentication table to authenticate the user accessing said storage system, and said authentication name authorization table to judge whether the authenticated user accessing from the authorized first storage system has a valid access right to said storing area and permits the access only when the user has the valid access right.

14. A storage system having a plurality of storing areas that can be accessed from a computer connected through a network,
wherein said storage system comprising:
an arithmetic unit, and
a memory,
wherein said memory stores an authorization table which stores a combination of an identifier of a computer and an identifier of a storing area that said computer is permitted to access, an authentication table which stores a combination of an identifier of a user and authentication information which authenticates said user, and an authentication name authorization table which stores a combination of an identifier of a user and a storing area identifier of a storing area that said user can access and a combination of the identifier of said user and a computer identifier which identifies a computer that the user identified by said identifier is permitted to use,
wherein when a login request that includes the identifier of said computer and an identifier of a storing area as an access destination is received from said computer, then said arithmetic unit performs authorization processing to check the received login request referring to said authorization table to authorize the computer which is the source of said login request,
wherein when an authentication request that includes the identifier and the authentication information of the user is received from said computer, then said arithmetic unit performs authentication processing to check the received authentication request referring to said authentication table to authenticate validity of said user, and
wherein when an authentication request that includes the identifier of the computer authorized in said authorization processing, the identifier of the storing area that said computer is permitted to access and the identifier of the user authenticated in said authentication processing is received from said computer, then said arithmetic unit performs authentication name authorization processing to check the received authentication request referring to said authentication name authorization table and accepts the login request when the received authentication request agrees with the authentication name authorization table.

15. A storage system that can be accessed from a plurality of devices connected through a network and has a plurality of storing areas, wherein said storage system comprises:

a control unit and a plurality of disk devices that constitute said plurality of storing areas and are connected to said control unit, wherein said control unit comprises:

an interface connected to said network, a memory and a second interlace connected to said plurality of disk devices, wherein said memory stores an authorization table which stores a combination of a device identifier which identifies one of said plurality of devices and a storing area identifier which specifies a storing area that a device identified by said device identifier can access, an authentication table which stores a combination of a user identifier which identifies a user who uses said device and authentication information which authenticates said user, and an authentication name authorization table which stores a combination of said user identifier and a storing area identifier of a storing area that the user identified by said user identifier is permitted to access, and wherein said control unit uses said authorization table to authorize a device accessing a storing area, said authentication table to authenticate a user accessing said storage system, and said authentication name authorization table to judge whether the authenticated user accessing from said authorized device has a valid access right to said storing area, and permits the access only when said user has the valid access right.

16. A storage system according to claim 15, wherein, said plurality of devices are a plurality of computers.

17. A storage system according to claim 15, wherein said plurality of devices are a plurality of storage systems.

18. A computer system comprising:

a computer on which an initiator operates;

a storage system on which targets operate;

a network that connects said computer and said storage system with each other;

a storage management device connected to said network; and a name management device connected to said network, wherein; according to an instruction of a user, said computer sends said storage system a login request that includes an identifier of said initiator and an identifier of a target and an authentication request that includes an identifier which identifies said user and authentication information, wherein said storage system has an authorization table which stores a combination of the identifier of said initiator and an identifier of a target that said initiator is permitted to log in among said targets, an authentication table which stores a combination of the identifier of the user of said computer and the authentication information which authenticates said user, and an authentication name authorization table which stores a combination of the identifier of said user and an identifier of a target that said user is permitted to access among said targets, wherein said storage management device has an input device which receives input of information to be stored into said authorization table, said authentication table and said authentication name authorization table, wherein said storage management device sends information input through said input device to said storage system through said network, wherein said storage management device acquires identifiers of said initiator and said targets operating respectively on said computer and said storage system connected to said network, and has an interface which presents the acquired identifiers in a format in which a user can select identifiers, wherein said name management device has a domain table which manages the identifier of said initiator in association with the identifier of said target that said initiator is permitted to access, wherein when said name management device receives a discovery request including the identifier of said initiator from said initiator, then said name management device returns the identifier of the target that said initiator is permitted to access, to the initiator which is the request source, wherein before said computer sends said first login request, said computer sends a discovery request including the identifier of said initiator to said name management device, to acquire the identifier of the target that said initiator is permitted to access, and wherein said storage system uses said authorization table to authorize the initiator which is the sending source of said login request, said authentication table to authenticate the user who has sent said authentication request, and said authentication name authorization table to judge whether the authenticated user who has logged in from said authorized initiator has a valid access right to said target, and permits the login only when said user has the valid access right.

\* \* \* \* \*